United States Patent
Hotta et al.

(10) Patent No.: US 8,757,657 B1
(45) Date of Patent: Jun. 24, 2014

(54) SIDE AIRBAG APPARATUS

(71) Applicant: Toyoda Gosei Co., Ltd., Kiyosu (JP)

(72) Inventors: Masashi Hotta, Kiyosu (JP); Yuji Sato, Kiyosu (JP); Kensaku Honda, Kiyosu (JP); Yoshiaki Goto, Kiyosu (JP); Eiji Sato, Kiyosu (JP); Takashi Iida, Kiyosu (JP); Akira Yamashita, Kiyosu (JP); Takuya Hiraiwa, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 14/150,935

(22) Filed: Jan. 9, 2014

(30) Foreign Application Priority Data

Jan. 25, 2013 (JP) .................................. 2013-012410
Nov. 25, 2013 (JP) .................................. 2013-243097

(51) Int. Cl.
*B60R 21/16* (2006.01)

(52) U.S. Cl.
USPC ...................... 280/730.2; 280/739; 280/743.1

(58) Field of Classification Search
USPC ............................ 280/729, 730.2, 739, 743.1
See application file for complete search history.

(56) References Cited

U.S. PATENT DOCUMENTS

| | | | | |
|---|---|---|---|---|
| 5,853,191 A | * | 12/1998 | Lachat | 280/730.2 |
| 7,607,682 B2 | * | 10/2009 | Kurimoto et al. | 280/729 |
| 7,644,950 B2 | * | 1/2010 | Kloss et al. | 280/740 |
| 7,900,957 B2 | * | 3/2011 | Honda | 280/729 |
| 8,328,227 B2 | * | 12/2012 | Shimono | 280/729 |
| 8,356,835 B2 | * | 1/2013 | Yamamoto | 280/730.2 |
| 8,419,060 B2 | * | 4/2013 | Yamamoto et al. | 280/743.2 |
| 8,528,934 B2 | * | 9/2013 | Kobayshi et al. | 280/740 |
| 8,550,495 B2 | * | 10/2013 | Sato et al. | 280/730.2 |
| 8,567,817 B2 | * | 10/2013 | Yamamoto | 280/729 |
| 8,628,111 B2 | * | 1/2014 | Sugimoto et al. | 280/729 |
| 2009/0212539 A1 | * | 8/2009 | Honda et al. | 280/729 |

FOREIGN PATENT DOCUMENTS

| | | |
|---|---|---|
| JP | 2010-269646 A | 12/2010 |
| JP | 2011-126497 A | 6/2011 |

* cited by examiner

*Primary Examiner* — Toan To
(74) *Attorney, Agent, or Firm* — Posz Law Group, PLC

(57) ABSTRACT

A lateral partition is formed by a pair of structural fabric portions, each of which has a first peripheral portion and a second peripheral portion. The first peripheral portions of the structural fabric portions are each joined to one of main body fabric portions. The second peripheral portions of the structural fabric portions are joined to each other by a joint portion provided along the second peripheral portions. An inner tube extends over the upper inflation chamber and the lower inflation chamber, while intersecting with the lateral partition. A rear peripheral portion of a part of the inner tube is joined to the main body fabric portions by a part of the peripheral joint portion, and a front peripheral portion of the part is joined to the structural fabric portions by the joint portion.

4 Claims, 18 Drawing Sheets

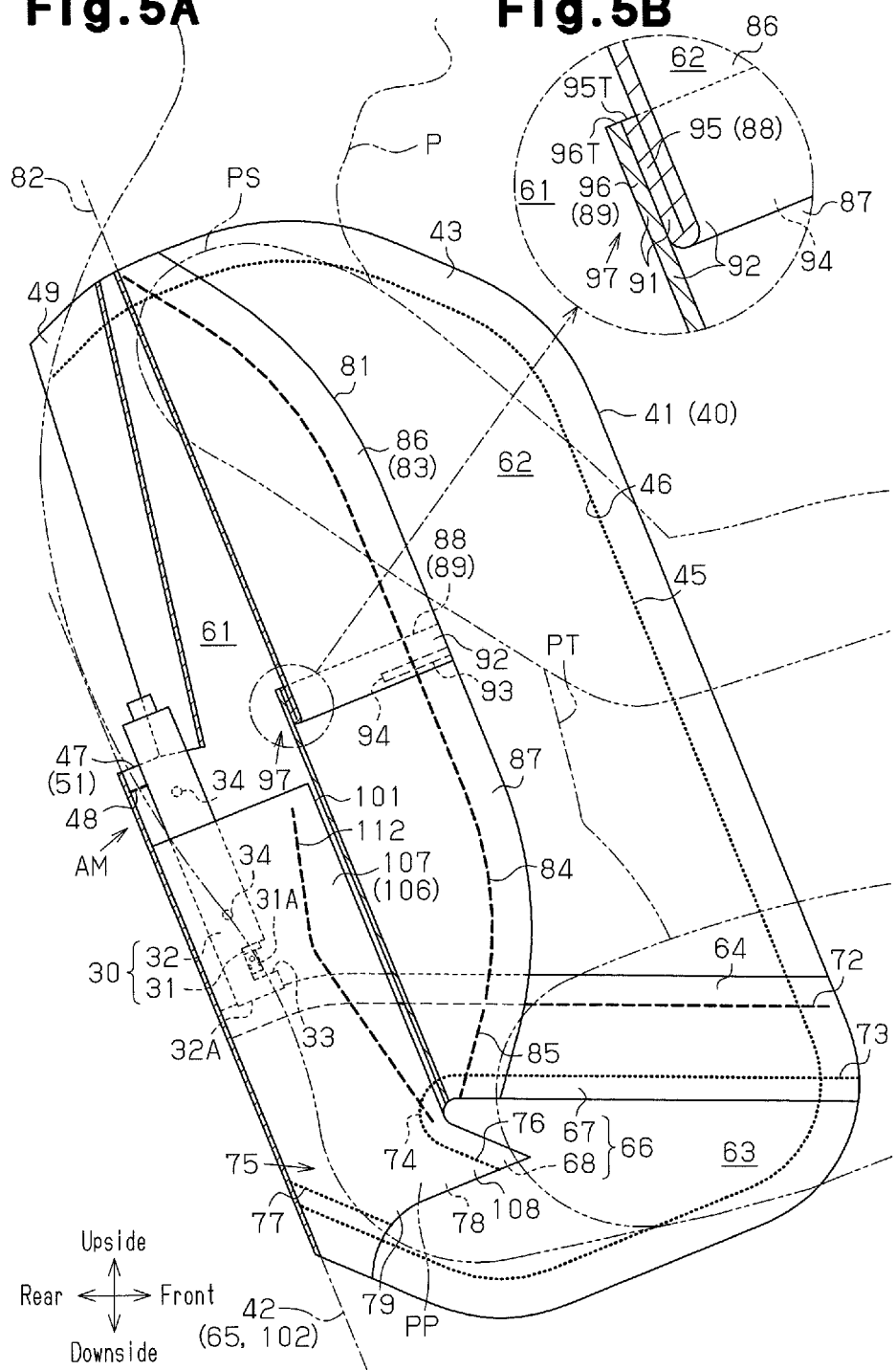

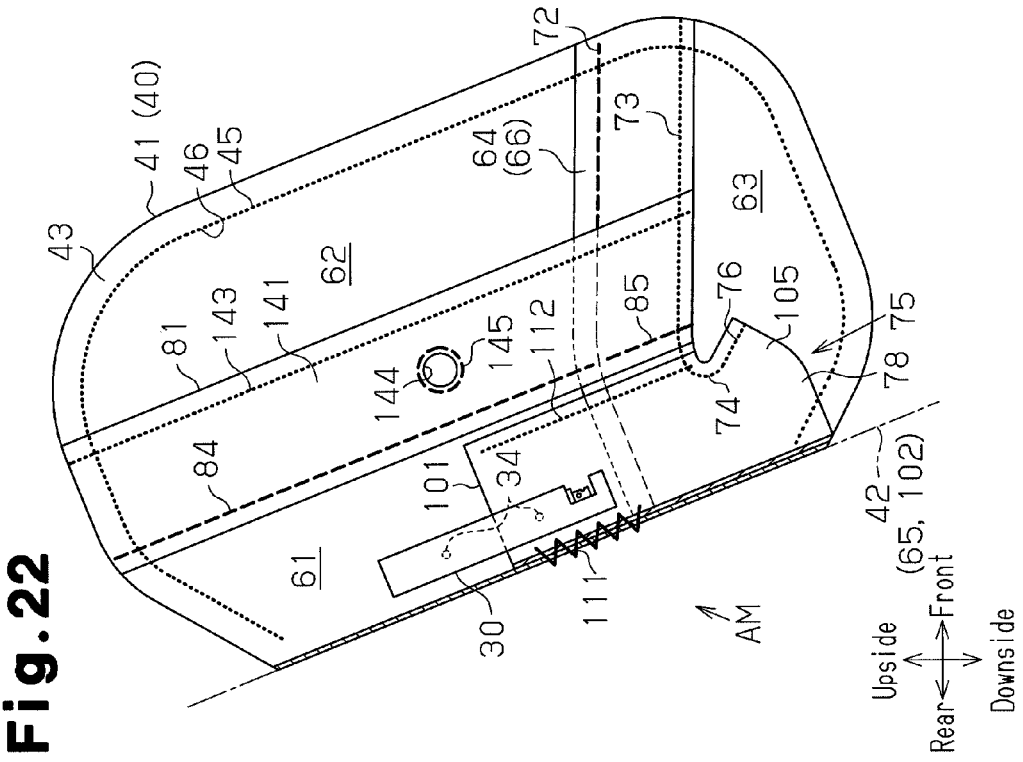
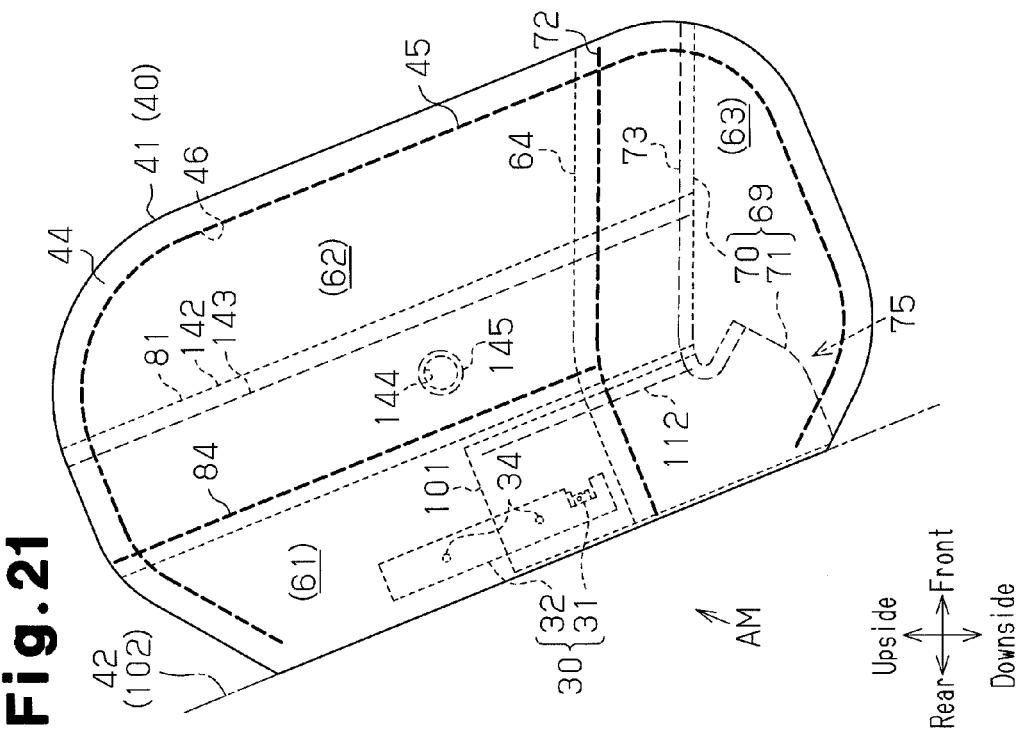

Fig.27A
Fig.27B
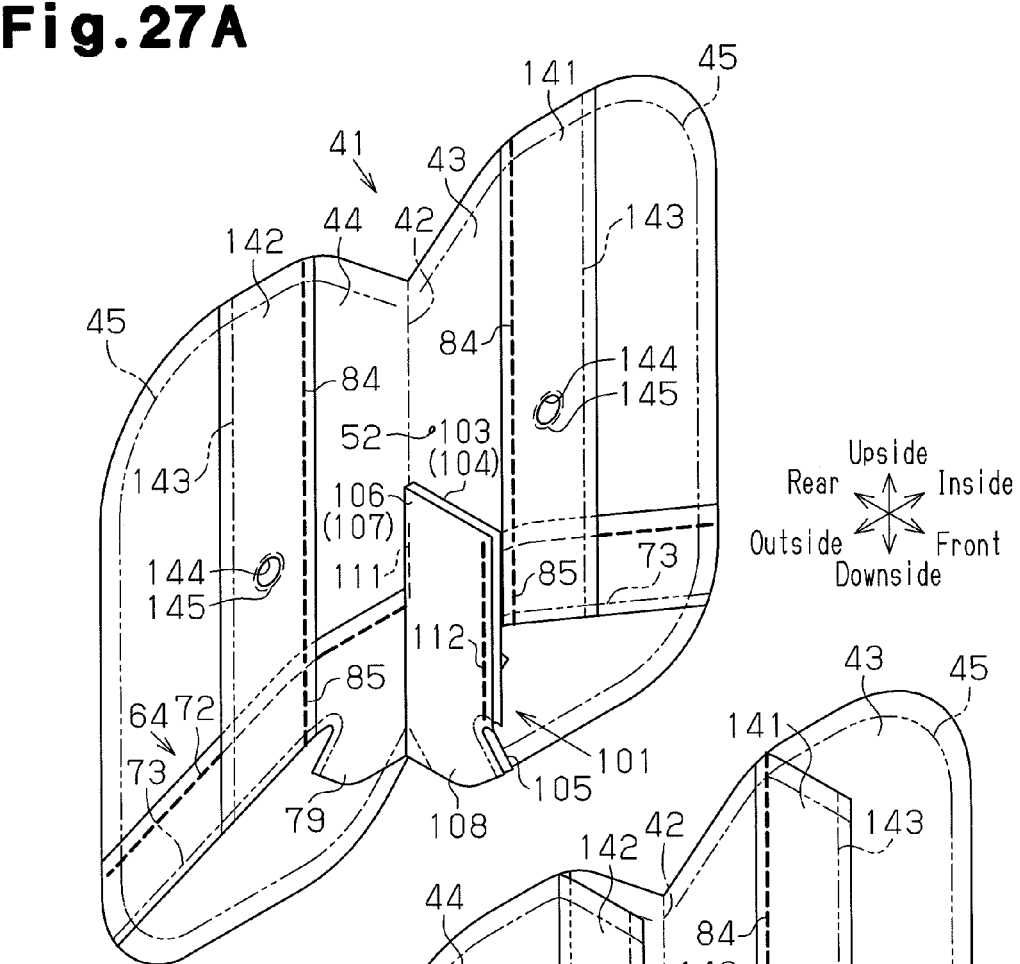
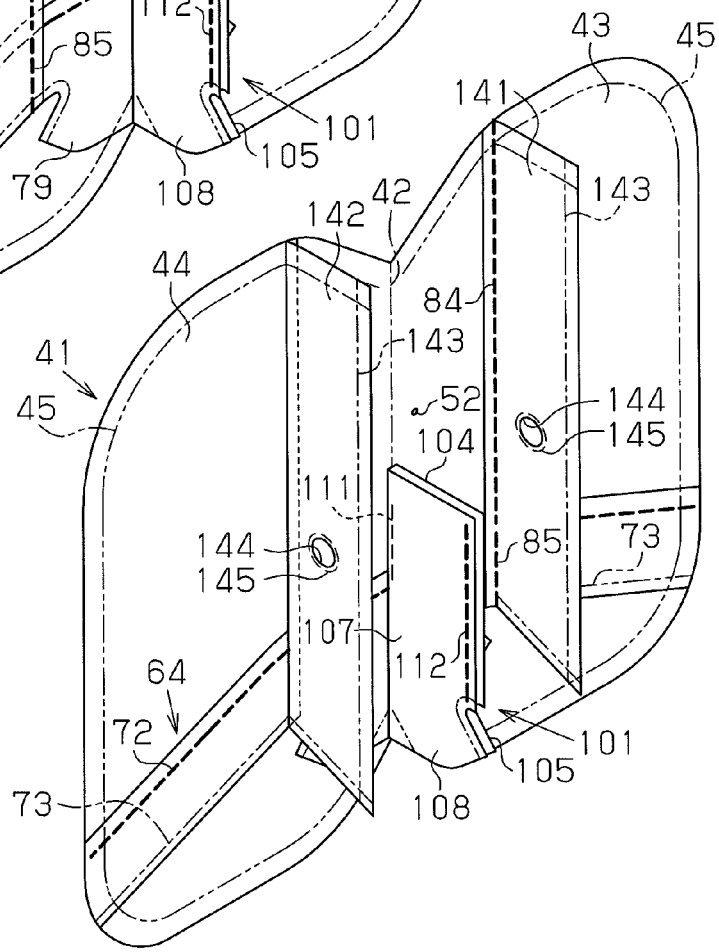

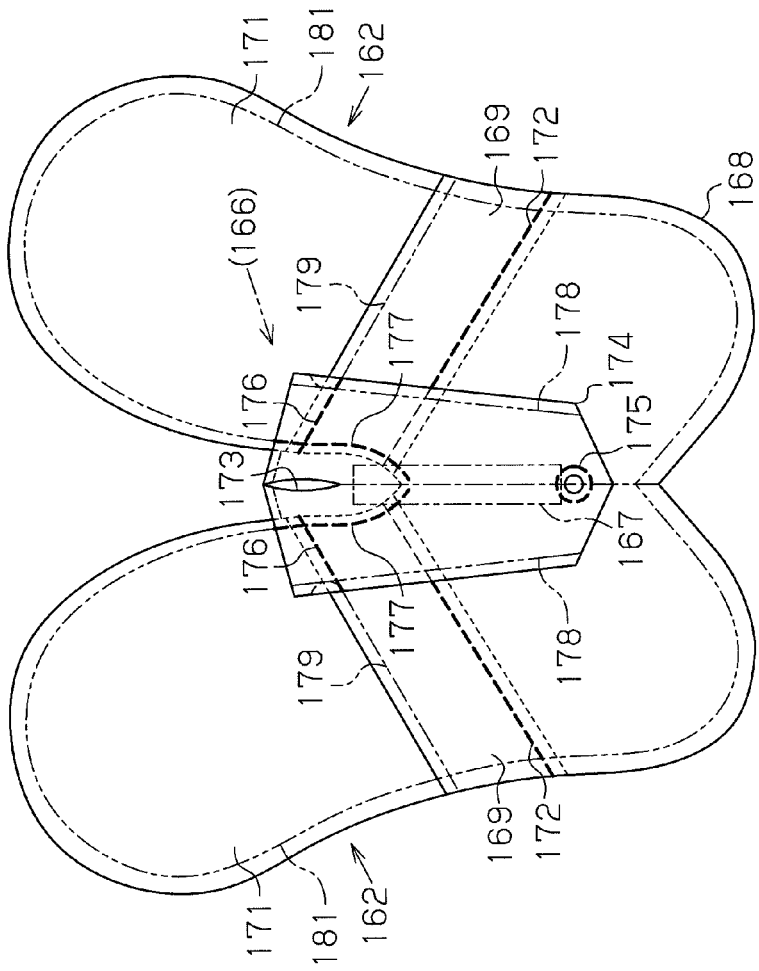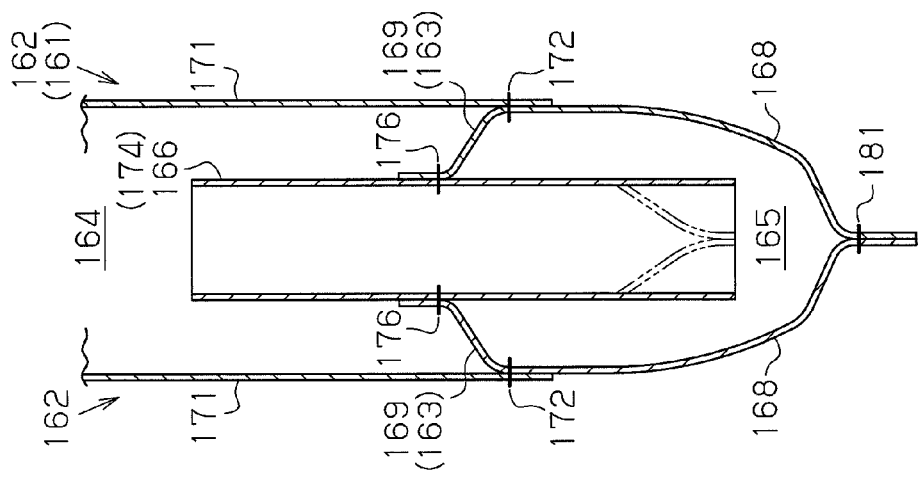

SIDE AIRBAG APPARATUS

BACKGROUND OF THE INVENTION

The present invention relates to a side airbag apparatus that protects an occupant seated in a vehicle seat from an impact by deploying and inflating an airbag on a side of the occupant when an impact is applied to a vehicle.

A side airbag apparatus having an airbag and an inflator is widely known for protecting an occupant from an impact when the impact is applied to a vehicle from a side to a vehicle seat in which the occupant is seated, for example, due to a side collision. In the side airbag apparatus, an airbag is installed in a seat back of a vehicle seat in a folded state together with an inflator. The outer shape of the airbag is formed by an airbag main body.

In the side airbag apparatus, when an impact is applied from the side on a body side portion such as a side door, which forms the side portion of a vehicle, inflation gas is supplied from the inflator into an inflation portion of the airbag, so that the airbag main body is deployed and inflated. The airbag is projected from the vehicle seat with a part of the airbag remaining in the seat back. Thereafter, the airbag main body continues being deployed and inflated forward in a narrow space between the occupant and the body side portion. The airbag main body is located between the occupant and the body side portion, which bulges inward, to restrain the occupant and reduces the impact from the side transmitted to the occupant via the body side portion.

One form of such a side airbag apparatus is disclosed in Japanese Laid-Open Patent Publication No. 2010-269646. The side airbag apparatus includes an airbag main body 161 having an inflation portion as illustrated in FIGS. 28 and 31. The airbag main body 161 is formed by sewing two main body fabric portions 162 to each other at peripheral joint portions 181, which are provided along the peripheries. The inflation portion of the airbag main body 161 is divided by a lateral partition 163 extending between the main body fabric portions 162 into an upper inflation chamber 164 located above the lateral partition 163 and a lower inflation chamber 165 located below the lateral partition 163. An inner tube 166 is provided in the inflation portion. The inner tube 166 intersects with the lateral partition 163 and extends over the upper inflation chamber 164 and the lower inflation chamber 165. An inflator 167 is located in the inner tube 166 (refer to FIGS. 29 and 31).

The airbag main body 161 of the above described side airbag apparatus is formed by a single lower ground fabric sheet 168 and a pair of upper ground fabric sheets 171. A pair of branch portions 169 is formed at the top of the lower ground fabric sheet 168. The lower part of each upper ground fabric sheet 171 is overlaid onto one of the branch portions 169. Each upper ground fabric sheet 171 is joined to the base of the corresponding branch portion 169 at an outer joint portion 172, which is arranged along the lower peripheral portion of the upper ground fabric sheet 171. Each of the halves of the lower ground fabric sheet 168 and the joined upper ground fabric sheet 171 form one of the main body fabric portions 162.

The inner tube 166 is formed by a tube ground fabric sheet 174, which has an insertion port 173 in an upper part thereof. The tube ground fabric sheet 174 has a joint portion 175 in a lower end portion (see FIG. 31), at which the tube ground fabric sheet 174 is joined to the lower ground fabric sheet 168, and a pair of joint portions 176 in an upper end portion, at which the tube ground fabric sheet 174 is joined to the branch portions 169 of the lower ground fabric sheet 168. The tube ground fabric sheet 174 also has joint portions 177 provided about the insertion port 173 (refer to FIG. 31), by which the tube ground fabric sheet 174 is joined to the lower ground fabric sheet 168 and the upper ground fabric sheets 171. Further, the tube ground fabric sheet 174 has joint portions 178, which are provided at opposite peripheral portions. The tube ground fabric sheet 174 is folded in half and the joint portions 178 are joined to form a tubular shape.

The upper peripheries of the branch portions 169 are joined to each other by inner joint portions 179. The branch portions 169, which are thus joined to each other, form the lateral partition 163. The inflator 167 is arranged in the inner tube 166 through the insertion port 173.

SUMMARY OF THE INVENTION

In the side airbag apparatus disclosed in Japanese Laid-Open Patent Publication No. 2010-269646, inflation gas discharged by the inflator 167 is distributed to the upper inflation chamber 164 and the lower inflation chamber 165 by the inner tube 166. However, the side airbag apparatus has the following drawbacks.

In the side airbag apparatus disclosed in Japanese Laid-Open Patent Publication No. 2010-269646, when inflation gas is discharged through the lower end of the inner tube 166, a part of the inner tube 166 that is closer to the lower inflation chamber 165 than the joint portion 176 flaps. Since the lower end of the inner tube 166 is joined to the lower ground fabric sheet 168 by the joint portion 175, flapping of the inner tube 166 is suppressed in the vicinity of the joint portion 175. However, flapping of the inner tube 166 is suppressed by the joint portion 175 only in a small area about the joint portion 175. Thus, the direction in which inflation gas is discharged from the lower end of the inner tube 166 is destabilized. This in turn may hinder stable deployment and inflation of the lower inflation chamber 165.

Accordingly, it is an objective of the present invention to provide a side airbag apparatus that suppresses flapping of an inner tube when inflation gas flows therethrough.

To achieve the foregoing objective, and in accordance with one aspect of the present invention, a side airbag apparatus is provided that includes a bag-shaped airbag main body having an inflation portion and an inflator having a gas outlet that discharges inflation gas for inflating the inflation portion of the airbag main body. The airbag main body is formed by a pair of main body fabric portions. The main body fabric portions are overlaid onto each other in a widthwise direction of a vehicle seat. Peripheries of the main body fabric portions are joined to each other at a peripheral joint portion. The airbag main body is deployed forward on a side of an occupant seated in the vehicle seat as the inflation portion is inflated. The airbag main body includes a lateral partition and an inner tube. The lateral partition extends between the main body fabric portions. The lateral partition divides at least a part of the inflation portion into an upper inflation chamber above the lateral partition and a lower inflation chamber below the lateral partition. The inner tube encompasses at least the gas outlet of the inflator. The inner tube extends in the inflation portion and over the upper inflation chamber and the lower inflation chamber, while intersecting with the lateral partition. The lateral partition is formed by a pair of structural fabric portions. Each structural fabric portion has a first peripheral portion and a second peripheral portion. The first peripheral portions of the structural fabric portions are each joined to one of the main body fabric portions. The second peripheral portions of the structural fabric portions are joined to each other by a joint portion provided along the second peripheral portions. The inner tube intersects with the lateral partition at least at a lower end of the inner tube. A rear peripheral portion of a part of the inner tube that intersects with the lateral partition is joined to the main body fabric portions by a part of the peripheral joint portion. A front peripheral portion of the part of the inner tube that intersects with the lateral partition is joined to the structural fabric portions by a part of the joint portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5A is a partial cross-sectional side view showing the internal structure of the airbag module shown in FIG. 4, together with an occupant;

FIG. 5B is an enlarged partial cross-sectional side view illustrating a part of FIG. 5A;

FIG. 21 is a side view of a side airbag apparatus according to a second embodiment, illustrating an airbag module in a state where an airbag main body is in an uninflated and deployed state;

FIG. 22 is a partial cross-sectional side view showing the internal structure of the airbag module shown in FIG. 21;

FIG. 27A is an explanatory perspective view showing a state subsequent to FIGS. 26A and 26B, illustrating the intermediate joining step of the airbag;

FIG. 27B is an explanatory perspective view showing a state subsequent to FIGS. 26A and 26B, illustrating the intermediate joining step of the airbag;

FIG. 30 is a partial cross-sectional view taken along line 30-30 of FIG. 28, showing the internal structure of the airbag; and FIG. 31 is a developed view showing a middle state in a manufacturing procedure for the airbag in the conventional side airbag apparatus.

DETAILED DESCRIPTION OF THE PREFERRED EMBODIMENTS

First Embodiment

A side airbag apparatus according to a first embodiment of the present invention will now be described with reference to FIGS. 1 to 20.

The side airbag apparatus of the first embodiment is mounted on a vehicle. In the following, the direction in which a vehicle advances forward will be referred to as the front, and reverse direction will be referred to as the rear. The middle of the widthwise direction of the vehicle is used as reference in the widthwise direction of the vehicle. A side closer to the middle of the widthwise direction will be referred to as "inner side" of the vehicle, while a side farther from the middle of the widthwise direction will be referred to "outer side" of the vehicle.

It is provided that an average sized occupant (adult) is seated on a vehicle seat in a predetermined posture (normal posture).

Figure 1:
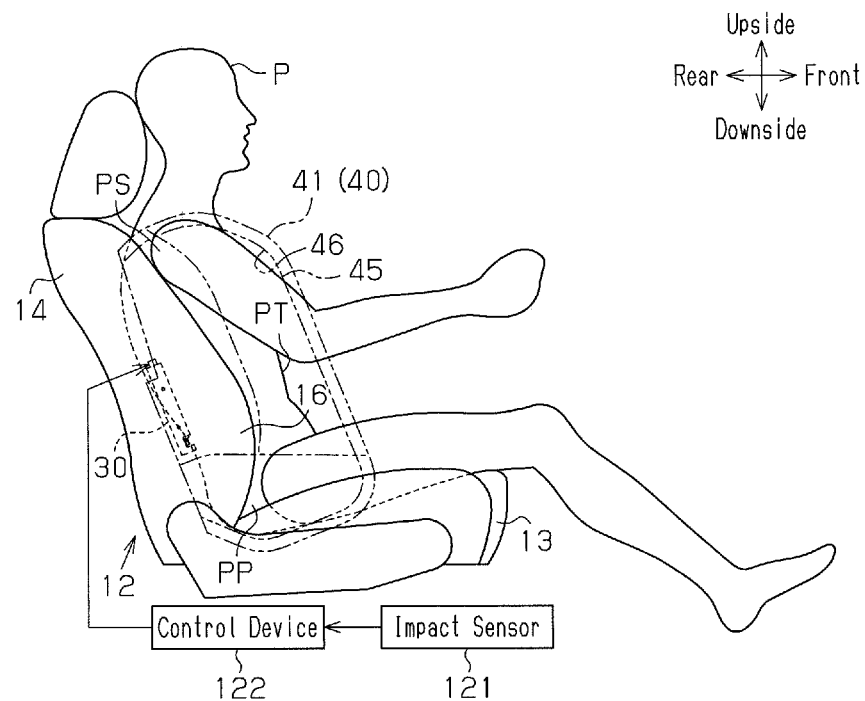
FIG. 1 is a side view illustrating a vehicle seat in which a side airbag apparatus according to a first embodiment is mounted, together with an occupant and an airbag.
Figure 2:
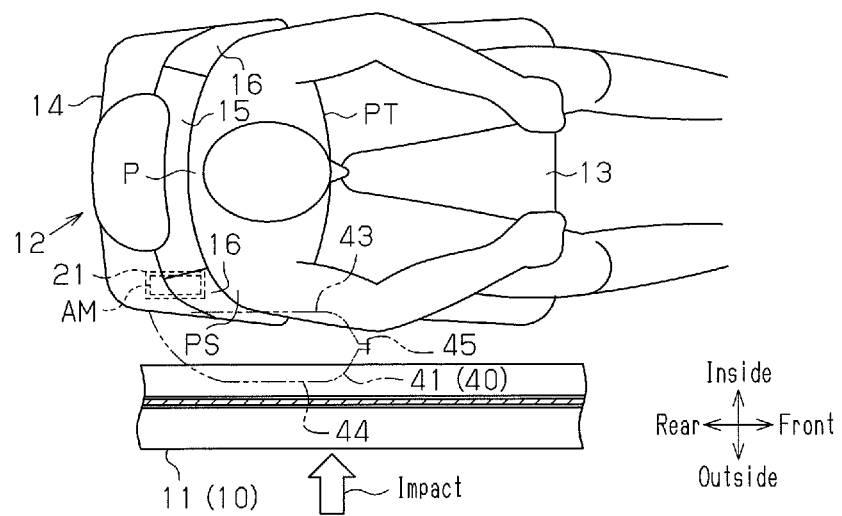
FIG. 2 is a schematic cross-sectional plan view of the positional relationship of the vehicle seat, the airbag, the occupant, and a body side portion according to the first embodiment.

As shown in FIGS. 1 and 2, a vehicle seat 12 is arranged on the inner side (upper side as viewed in FIG. 2) of a body side portion 11 of a vehicle 10. The body side portion 11 refers to a vehicle component that is located at a side of the vehicle 10, and mainly corresponds to doors and pillars. For example, a part of the body side portion 11 corresponding to the front seat includes a front door and a center pillar (B-pillar). A part of the body side portion 11 corresponding to the rear seat includes, for example, a rear part of the side door (rear door), a C-pillar, a front part of the wheel well, a rear quarter.

The vehicle seat 12 includes a seat cushion 13 and a seat back 14, which extends upward from the rear end of the seat cushion 13. The inclination angle of the seat back 14 can be adjusted by a tilt adjusting mechanism (not shown). The vehicle seat 12 is arranged in the vehicle 10 such that the seat back 14 faces forward of the vehicle 10. The widthwise direction of the thus arranged vehicle seat 12 matches with the widthwise direction of the vehicle 10.

The seat back 14 includes a seat back main body 15 and a pair of side support portions 16, which is provided on both side portions of the vehicle seat 12 in the widthwise direction. The seat back main body 15 is tilted rearward, and supports the upper body of an occupant P from the rear. The side support portions 16 protrude forward from the seat back main body 15. The side support portions 16 restrict the widthwise movement of the upper body of the occupant P seated on the seat cushion 13 and leaned against the seat back main body 15.

The internal structure of the outer side portion of the seat back 14 including the side support portion 16 on the outer side will now be described.

Figure 3:
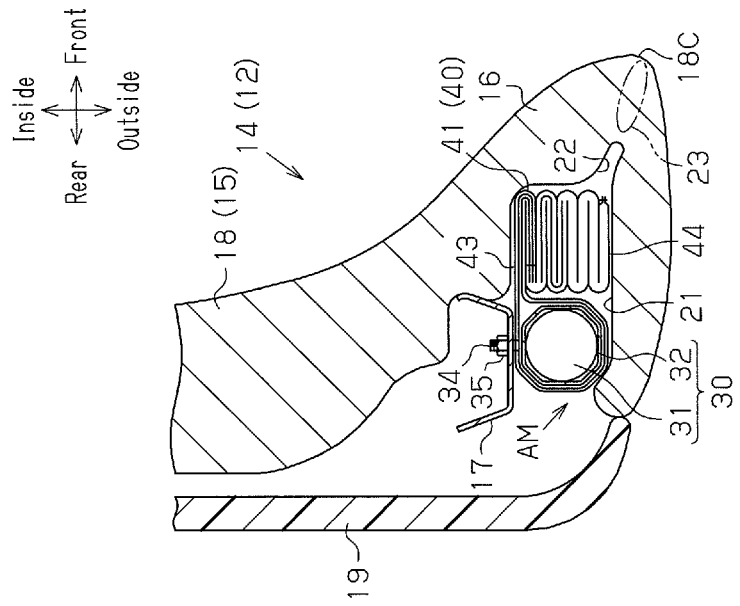
FIG. 3 is a partially cross-sectional plan view showing the internal structure of a side portion of the seat back in which the airbag module of the first embodiment is installed.

A seat frame, which forms a framework of the seat back 14, is incorporated in the seat back 14. As shown in FIG. 3, a part of the seat frame is located in the outer side portion of the seat back 14. The part is referred to as a side frame portion 17. The side frame portion 17 is formed by bending a metal plate. A seat pad 18, which is made of an elastic material such as urethane foam, is provided on the front side of the seat frame, which includes the side frame portion 17. Also, a hard back board 19, which is formed, for example, of plastic, is arranged on the back of the seat frame. Although the seat pad 18 is coated with a cover, the cover is not illustrated in FIG. 3. The cover of the seat pad 18 is also omitted from FIG. 17.

In the seat pad 18, a storage portion 21 is provided in the vicinity of the outer side portion of the side frame portion 17. The storage portion 21 is located at a middle part of the seat back 14 in the up-down direction and in the vicinity of and diagonally rearward of the occupant P seated in the vehicle seat 12 (see FIGS. 1 and 2). The storage portion 21 accommodates an airbag module AM, which forms a main part of the side impact airbag apparatus. The airbag module AM includes an inflator assembly 30 and an airbag 40.

The storage portion 21 has a corner at the outer front part, and a slit 22 is formed in the corner to extend forward and toward the exterior of the vehicle. A part between a front corner 18C of the seat pad 18 and the slit 22 (a part surrounded by a line formed by a long dash alternating with two short dashes in FIG. 3) forms a breakable portion 23, which is designed to be broken by an airbag 40. The components of the airbag module AM will now be described.

<Inflator Assembly 30>

As shown in FIGS. 3 to 5B, the inflator assembly 30 includes a gas generator, which is an inflator 31, and a retainer 32, which surrounds the inflator 31. In the first embodiment, a pyrotechnic inflator is used as the inflator 31. The inflator 31 is substantially columnar and accommodates a gas generating agent (not shown), which generates inflation gas. A gas outlet 31A is provided on one end of the inflator 31 in the longitudinal direction (the lower end). A harness (not shown), which is wiring for sending activating signals to the inflator 31, is connected to the other end of the inflator 31 in the longitudinal direction (the upper end).

In place of the pyrotechnic type inflator using the gas generating agent, it is possible to use a hybrid type inflator, which discharges inflation gas by breaking a partition wall of a high-pressure gas cylinder filled with high-pressure gas with a low explosive.

The retainer 32 functions as a diffuser for controlling the direction of discharged inflation gas and also serves to fasten the inflator 31, together with the airbag 40, to the side frame portion 17 (see FIG. 3). Most of the retainer 32 is formed by bending a plate such as a metal plate into a cylindrical shape that extends substantially in the up-down direction. The retainer 32 has an open end 32A at least at the lower end. The retainer 32 has a window 33 at a position substantially in front of the gas outlet 31A. A considerable amount of inflation gas discharged through the gas outlet 31A is delivered to the exterior of the retainer 32 through the open end 32A and the window 33.

Bolts 34 are fixed to the retainer 32. The bolts 34 serve as securing members for attaching the retainer 32 to the side frame portion 17. In other words, the bolts 34 are indirectly fixed to the inflator 31 by means of the retainer 32.

The inflator assembly 30 may be formed by integrating the inflator 31 and the retainer 32.

As shown in FIGS. 1 and 2, the outer shape of the airbag 40 is formed by an airbag main body 41.

<Airbag Main Body 41>

If an impact is applied to the body side portion 11 of the vehicle 10 due to a side collision or the like when the vehicle 10 is moving, the inflator 31 supplies inflation gas to the airbag main body 41. The airbag main body 41 is projected forward from the seat back 14 with a part of the airbag main body 41 remaining in the seat back 14. By being deployed and inflated in the vicinity of the upper body of the occupant P, who is seated in the vehicle seat 12, the airbag main body 41 restrains the occupant P to protect him/her from the impact.

Figure 4:
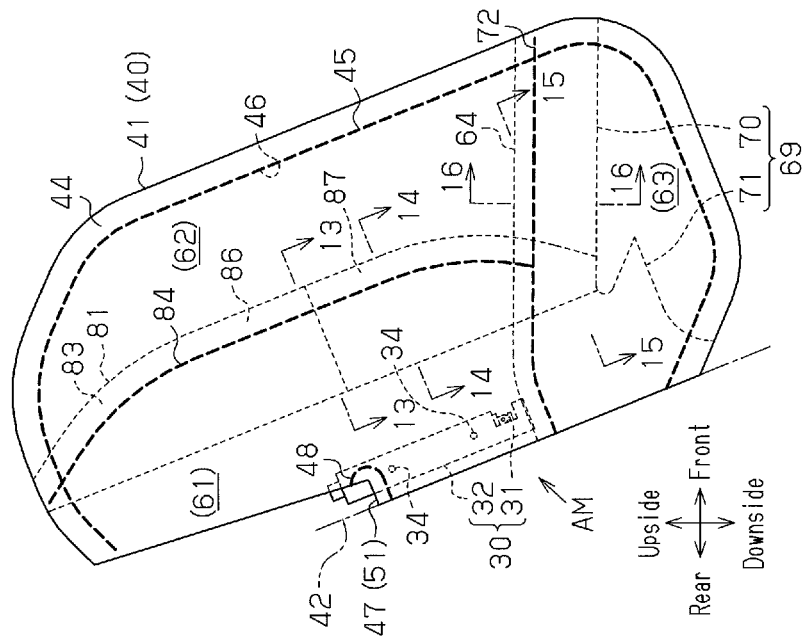
FIG. 4 is a side view illustrating the airbag module in a state where the airbag main body is in an uninflated and deployed state in the first embodiment.

FIG. 4 shows the airbag module AM in the state in which the airbag main body 41 is deployed in a planar form without being filled with the inflation gas G (hereinafter, referred to as an uninflated and deployed state). FIGS. 5A and 5B shows the internal structure of the airbag module AM and the occupant P. FIG. 5A shows the airbag module AM, in which the airbag main body 41 in the uninflated and deployed state of FIG. 4 is cut at the center portion in the vehicle widthwise direction.

As shown in FIGS. 4, 5A, and 5B, the airbag main body 41 is formed by folding a single fabric piece (also referred to as a base fabric, or a fabric panel) along a folding line 42 set at the center portion to be overlapped in the vehicle widthwise direction, and joining the overlapped portion into a bag shape. In the present description, to distinguish the two overlapped portions of the airbag main body 41, the part located on the inner side is referred to as a main body fabric portion 43 (see FIGS. 5A and 5B), and the part located on the outer side is referred to as a main body fabric portion 44 (see FIG. 4).

In the first embodiment, the fabric piece is folded in half such that the folding line 42 is located at the rear end of the airbag main body 41. However, the fabric piece may be folded in half such that the folding line 42 is located at another end such as the front end, the upper end, or the lower end. The airbag main body 41 may also be formed of two fabric pieces divided along the folding line 42. In this case, the airbag main body 41 is formed by overlapping the two fabric pieces in the vehicle widthwise direction, and joining the fabric pieces into a bag shape. Furthermore, the airbag main body 41 may be formed of three or more fabric pieces.

Figure 6:
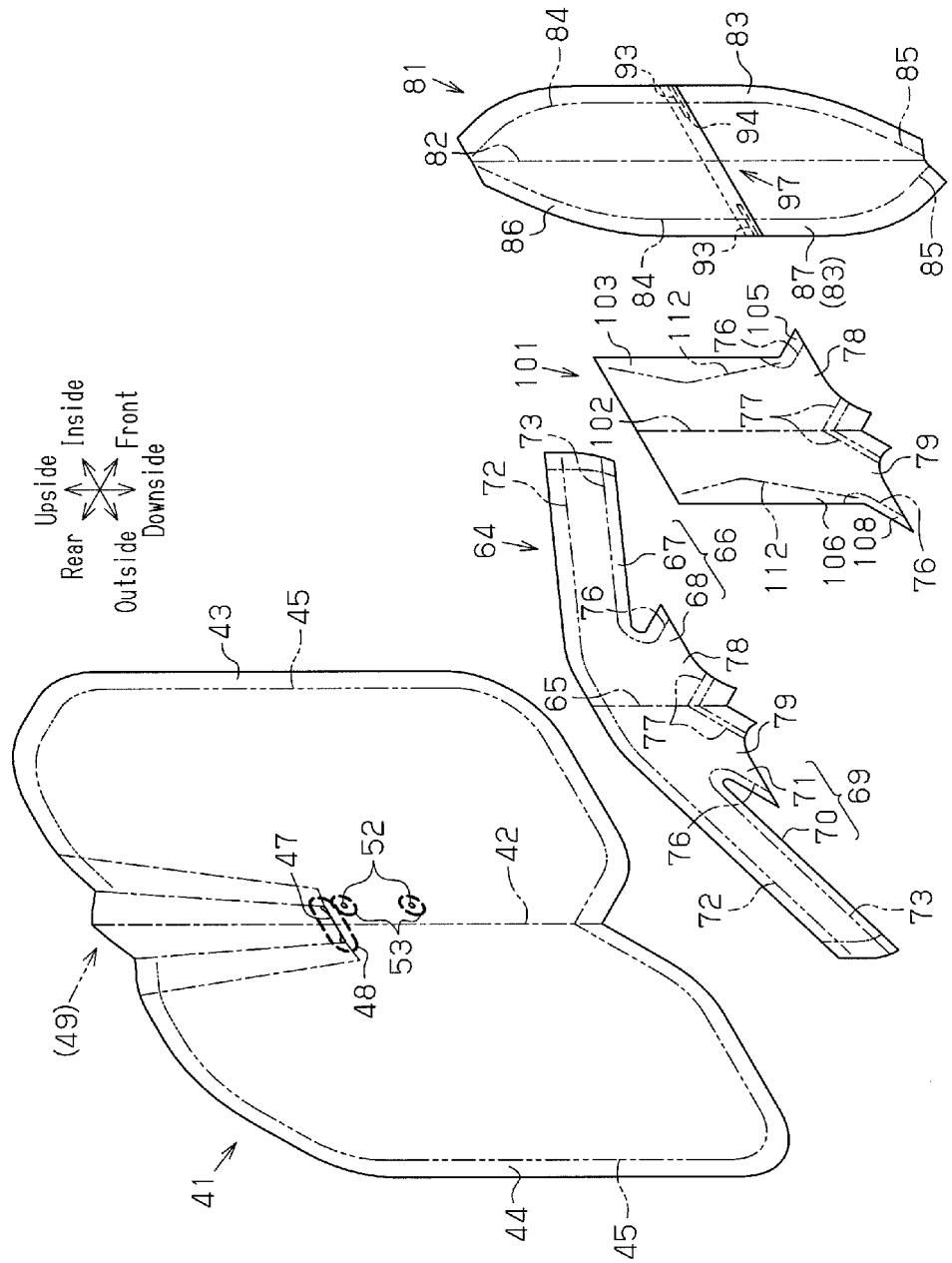
FIG. 6 is an exploded perspective view showing a spread state of the components of the airbag according to the first embodiment.

In the airbag main body 41, the outer shapes of the main body fabric portions 43, 44 are symmetric with respect to the folding line 42 (see FIG. 6). The shape and size of the main body fabric portions 43, 44 are set to be able to occupy the region corresponding to most part of the upper body of the occupant P seated on the vehicle seat 12 (the section from a lumbar region PP to a shoulder region PS) when the airbag main body 41 is deployed and inflated between the vehicle seat 12 and the body side portion 11.

The main body fabric portions 43, 44 are preferably formed of a material having high strength and flexibility to be easily folded. The material may be, for example, woven cloth formed of polyester threads or polyamide threads.

The main body fabric portions 43, 44 are joined to each other at a peripheral joint portion 45 provided at the peripheries of the main body fabric portions 43, 44. In the first embodiment, most of the peripheral joint portion 45 is formed by sewing with sewing threads a part of the peripheries of the main body fabric portions 43, 44 except the rear end (the part in the vicinity of the folding line 42).

Three types of lines represent sewing portions in FIGS. 4 to 12 and 18. The first type of line includes thick lines with a certain length arranged intermittently (a kind of broken line), and represents sewn portions as viewed from the side (refer to the peripheral joint portion 45 in FIG. 4). The second type of line includes thin lines with a certain length (longer than a typical broken line) arranged intermittently (a kind of broken line), and represents the state of the sewing threads that are located behind the outer side main body fabric portion 44 and cannot be seen directly (refer to an inner joint portion 93 in FIG. 5A). The third type of line includes dots arranged at predetermined intervals (a kind of a broken line), and represents the state of the sewing thread at the position between the main body fabric portions 43, 44, which are the target of sewing, and between structural fabric portions 66, 69 (see the peripheral joint portion 45 in FIG. 5A). That is, the drawings in which the sewn part is represented by the third type of line show the structure along the cross-section that passes through the sewn portion.

As shown in FIGS. 4 to 6, the space between the main body fabric portions 43, 44 and surrounded by the peripheral joint portion 45 serves as an inflation portion 46. When being deployed and inflated by inflation gas beside the upper body of the occupant P, the inflation portion 46 restrains the most part of the upper body and protects the upper body from the impact.

The peripheral joint portion 45 may be formed by a method other than sewing using sewing threads, but may be formed by, for example, using an adhesive.

Figure 7:
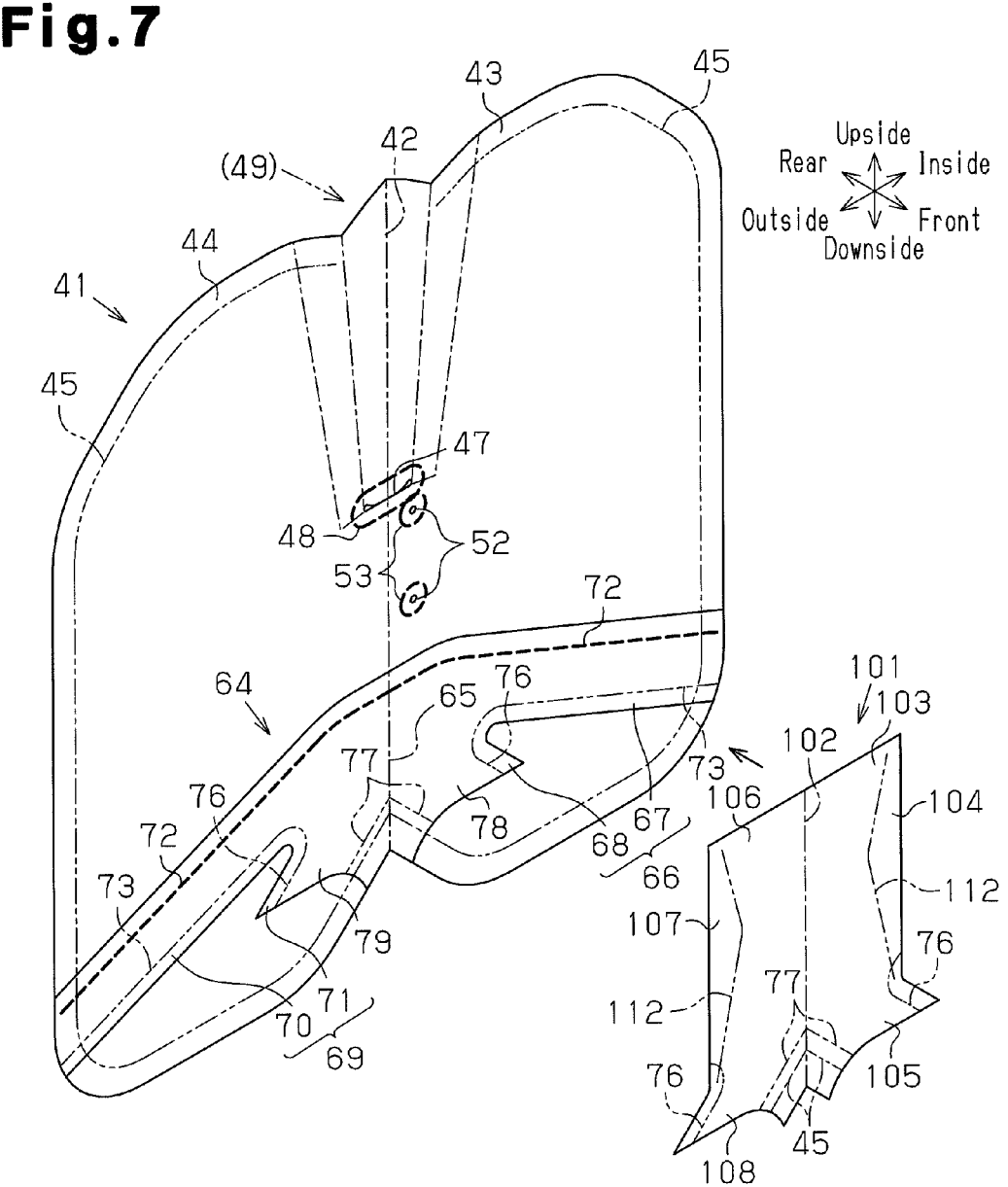
FIG. 7 is an explanatory perspective view showing a first joining step of the airbag according to the first embodiment.

The main body fabric portions 43, 44 have a slit 47, which is located at the rear end and in a middle portion in the up-down direction (see FIG. 7). The slit 47 extends forward and over the folding line 42. The main body fabric portions 43, 44 also have a reinforcement loop portion 48 about the slit 47. The reinforcement loop portion 48 is formed by sewing the part about the slit 47 in the main body fabric portions 43, 44 to reinforce the part surrounding the slit 47.

A part of the main body fabric portions 43, 44 above the slit 47 forms an inward folding portion 49, which is folded inward of the remaining parts of the main body fabric portions 43, 44. The upper end of the inward folding portion 49 is joined to the remaining parts of the main body fabric portions 43, 44 by the above described peripheral joint portion 45. When the inward folding portion 49 is folded, the slit 47 is opened to form an insertion port 51 for the inflator assembly 30.

The inner side main body fabric portion 43 has bolt holes 52 (the number of which is two in the present embodiment), which are located in the vicinity of the folding line 42 and below the slit 47. The bolts 34 of the retainer 32 (see FIG. 3) are passed through the bolt holes 52. The main body fabric portion 43 has reinforcement loop portions 53 about the bolt holes 52. Each reinforcement loop portion 53 is formed by sewing the part about a bolt hole 52 in the main body fabric portion 43 to reinforce the part surrounding the bolt hole 52.

As shown in FIG. 5A, the inflation portion 46 is divided into a first inflation chamber 61, which is deployed and inflated by being supplied with inflation gas, a second inflation chamber 62, which is located in front of the first inflation chamber 61 with a vertical partition 81 in between, and a third inflation chamber 63, which is located below the first and second inflation chambers 61, 62 with a lateral partition 64 in between. The vertical partition 81 and the lateral partition 64 each have the same structure as a member generally referred to as a tether.

The first inflation chamber 61 and the second inflation chamber 62 correspond to an upper inflation chamber located above the lateral partition 64, and the third inflation chamber 63 corresponds to a lower inflation chamber located below the lateral partition 64.

<Lateral Partition 64>

As shown in FIGS. 5A, 5B, and 6, the lateral partition 64 is formed of a material having high strength and flexibility to be easily folded. The lateral partition 64 is formed by folding a single fabric piece such as a woven fabric piece in half along a folding line 65 set at the center portion to be overlaid onto itself in the vehicle widthwise direction, and placing the overlaid portion between lower parts of the main body fabric portions 43, 44. The lower parts of the main body fabric portions 43, 44 are located beside the boundary between the lumbar region PP and the thorax PT of the occupant P. The lateral partition 64 may also be formed of two fabric pieces divided along the folding line 65.

Figure 16:
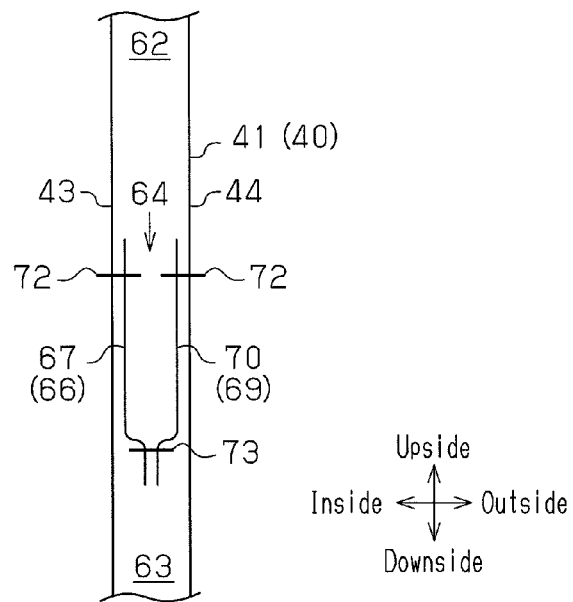
FIG. 16 is a partial cross-sectional view taken along line 16-16 of FIG. 4, schematically showing the internal structure of the airbag.

To distinguish the two overlapped portions of the lateral partition 64, the part located on the inner side is referred to as a structural fabric portion 66, and the part located on the outer side is referred to as a structural fabric portion 69 (see FIG. 16).

The inner side structural fabric portion 66 includes a main body forming fabric portion 67, which extends from the rear end to the front end of the main body fabric portion 43, and an extension 68, which extends forward and downward from the rear part of the main body forming fabric portion 67. The outer side structural fabric portion 69 also includes a main body forming fabric portion 70, which extends from the rear end to the front end of the main body fabric portion 44, and an extension 71, which extends forward and downward from the rear part of the main body forming fabric portion 70. The main body forming fabric portions 67, 70 are inclined to be lowered toward the front ends.

Figure 20:
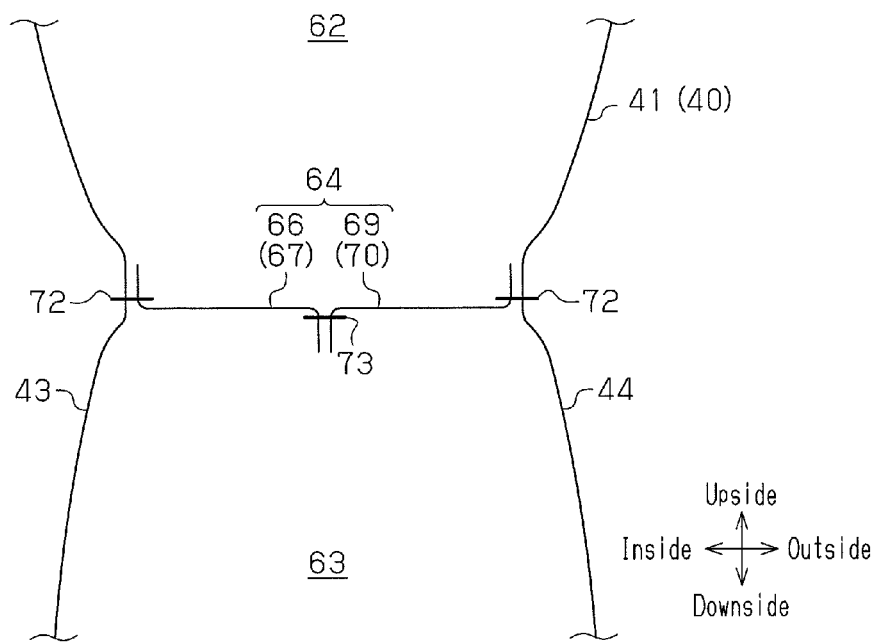
FIG. 20 is a partial cross-sectional view schematically showing the internal structure of the airbag when the lateral partition of FIG. 16 is tensed.

The lateral partition 64, which is folded in half as described above, is located between the main body fabric portions 43, 44 with the folding line 65 matched with the folding line 42 (FIGS. 16 and 20). The inner side main body forming fabric portion 67 has an outer joint portion 72 formed along a peripheral portion (first peripheral portion) on one end (upper end). The inner side main body forming fabric portion 67 is joined to the inner side main body fabric portion 43 by the outer joint portion 72. Likewise, the outer side main body forming fabric portion 70 has an outer joint portion 72 formed along a peripheral portion (first peripheral portion) on one end (upper end). The outer side main body forming fabric portion 70 is joined to the outer side main body fabric portion 44 by the outer joint portion 72. The main body forming fabric portions 67, 70 are joined to each other by a joint portion 73 located at the other peripheral portion (second peripheral portion) on the other ends (lower ends). Further, the front ends of the main body forming fabric portions 67, 70 are joined (sewn) to the front ends of the main body fabric portions 43, 44 by the peripheral joint portion 45 (refer to FIGS. 5A and 5B).

A part of the inflation portion 46 below the lateral partition 64 forms the third inflation chamber 63, which is deployed and inflated beside the lumbar region PP of the occupant P seated in the vehicle seat 12.

When the inflation portion 46 is deployed and inflated, the lateral partition 64 is tensed in the vehicle widthwise direction to limit the thickness of the inflation portion 46 in the same direction (see FIG. 20).

<Vertical Partition 81>

Figure 13:
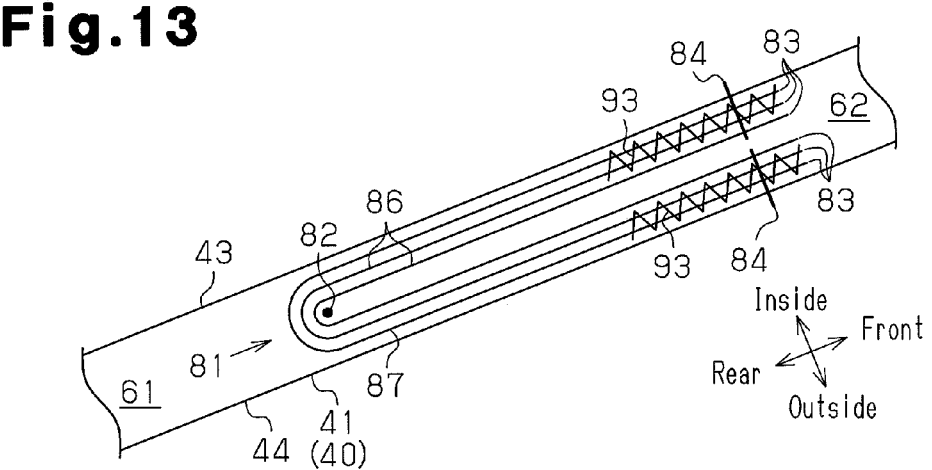
FIG. 13 is a partial cross-sectional view taken along line 13-13 of FIG. 4, schematically showing the internal structure of the airbag.
Figure 14:
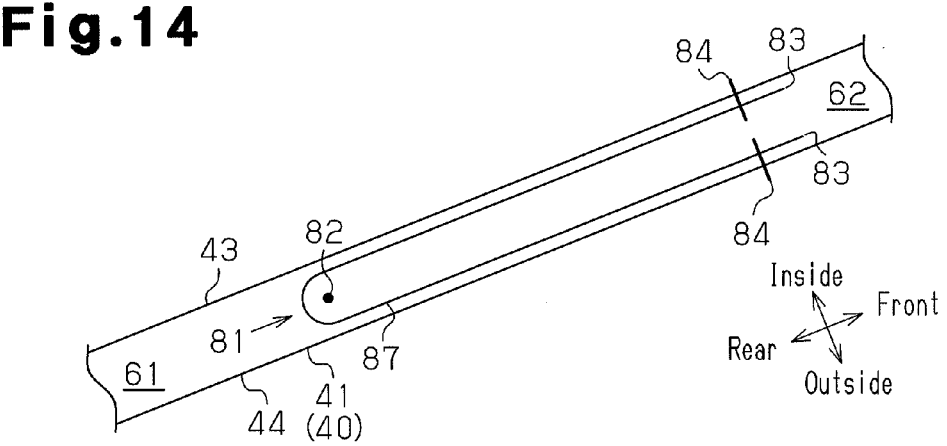
FIG. 14 is a partial cross-sectional view taken along line 14-14 of FIG. 4, schematically showing the internal structure of the airbag.
Figure 15:
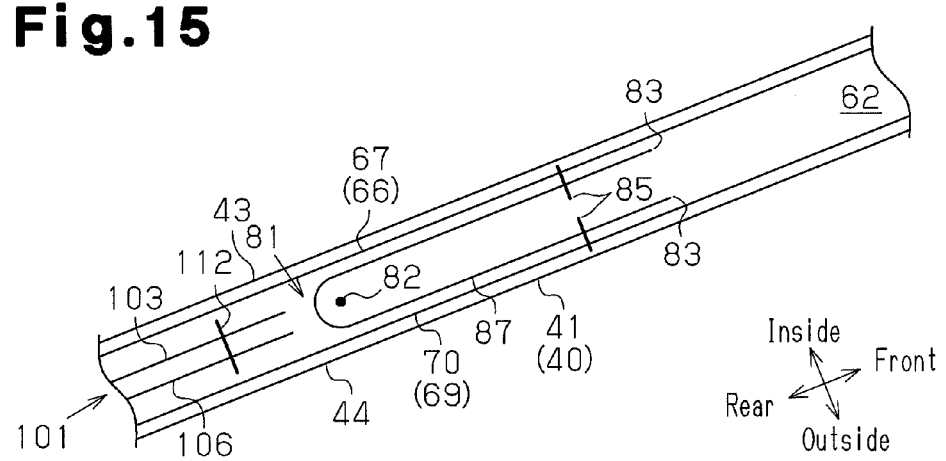
FIG. 15 is a partial cross-sectional view taken along line 15-15 of FIG. 4, schematically showing the internal structure of the airbag.

FIG. 13 shows a cross-sectional structure taken along line 13-13 of FIG. 4, and FIG. 14 shows a cross-sectional structure taken along line 14-14 of FIG. 4. FIG. 15 shows a cross-sectional structure taken along line 15-15 of FIG. 4, and FIG. 16 shows a cross-sectional structure taken along line 16-16 of FIG. 4. In FIGS. 13 to 16, the thickness of each component is omitted. The inner joint portions 93 are represented as zigzag lines in FIG. 13. As shown in FIGS. 5A, 5B, 13, and 14, the vertical partition 81 extends substantially in the up-down direction to intersect with the lateral partition 64. As shown in FIG. 6, the vertical partition 81 is tensed to be extended in a sheet-like shape as the first inflation chamber 61 is deployed and inflated. At this time, the dimension of the vertical partition 81 in the direction of the folding line 82 (hereinafter, referred to as a vertical direction) is longer than the dimension in the direction perpendicular to the folding line 82 (hereinafter, referred to as a lateral direction).

Figure 10:
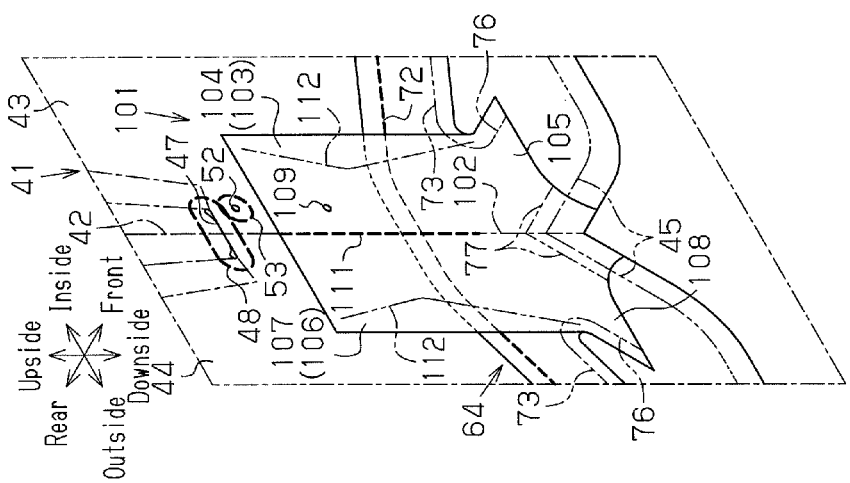
FIG. 10 is an explanatory perspective view showing a third joining step of the airbag according to the first embodiment.

As shown in FIGS. 4 and 10, the upper end of the vertical partition 81 is joined (sewn) to the upper ends of the main body fabric portions 43, 44 by the peripheral joint portion 45. The lower part of the vertical partition 81 is overlaid onto the rear parts of the main body forming fabric portions 67, 70. The lower end of the vertical partition 81 is joined (sewn) to the main body forming fabric portions 67, 70 of the lateral partition 64 by the joint portion 73.

As shown in FIG. 10, parts of the vertical partition 81 that are not overlaid onto the main body forming fabric portions 67, 70 are joined to the main body fabric portions 43, 44 by outer joint portions 84 provided along peripheral portions 83 on the sides in the vehicle widthwise direction. Parts of the vertical partition 81 that are overlaid onto the main body forming fabric portions 67, 70 are joined only to the main body forming fabric portions 67, 70 by outer joint portions 85 provided along the peripheral portions 83 (see FIG. 15).

The vertical partition 81 has an area 81A, which is sandwiched between the outer joint portions 84, 85, which are joined to the main body fabric portions 43, 44, in the uninflated and deployed state of the airbag main body 41. The vertical partition 81 is folded in half along the folding line 82 such that the area 81A is closer to the inflator assembly 30 than the joint portions.

The vertical partition 81 is located between the main body fabric portions 43, 44 by the above described joining operation. When the airbag main body 41 is in the uninflated and deployed state, the vertical partition 81 is folded in half (see FIGS. 5A, 5B, and 13 to 15). When the first inflation chamber 61 is deployed and inflated, the vertical partition 81 is tensed in the lateral direction (the vehicle widthwise direction, refer to FIG. 18) to limit the thickness of the first inflation chamber 61 in the inflated state.

When the upper inflation chamber in the inflation portion 46, which is located above the lateral partition 64, is deployed and inflated as shown in FIG. 5A, the vertical partition 81 is located in the vicinity of the boundary between the rear half and the front half of the upper body of the occupant P. The vertical partition 81 divides the upper inflation chamber, which is above the lateral partition 64, into the first inflation chamber 61, which is rearward of the vertical partition 81, and the second inflation chamber 62, which is forward of the vertical partition 81. The first inflation chamber 61 first receives inflation gas from the inflator 31.

The first inflation chamber 61 is deployed and inflated beside the shoulder region PS and the rear half of the thorax PT in the upper body of the occupant P, thereby restraining and protecting the shoulder region PS and the rear half of the thorax PT. The second inflation chamber 62 is deployed and inflated beside the front half of the thorax PT, thereby restraining and protecting the front half of the thorax PT.

Figure 18:
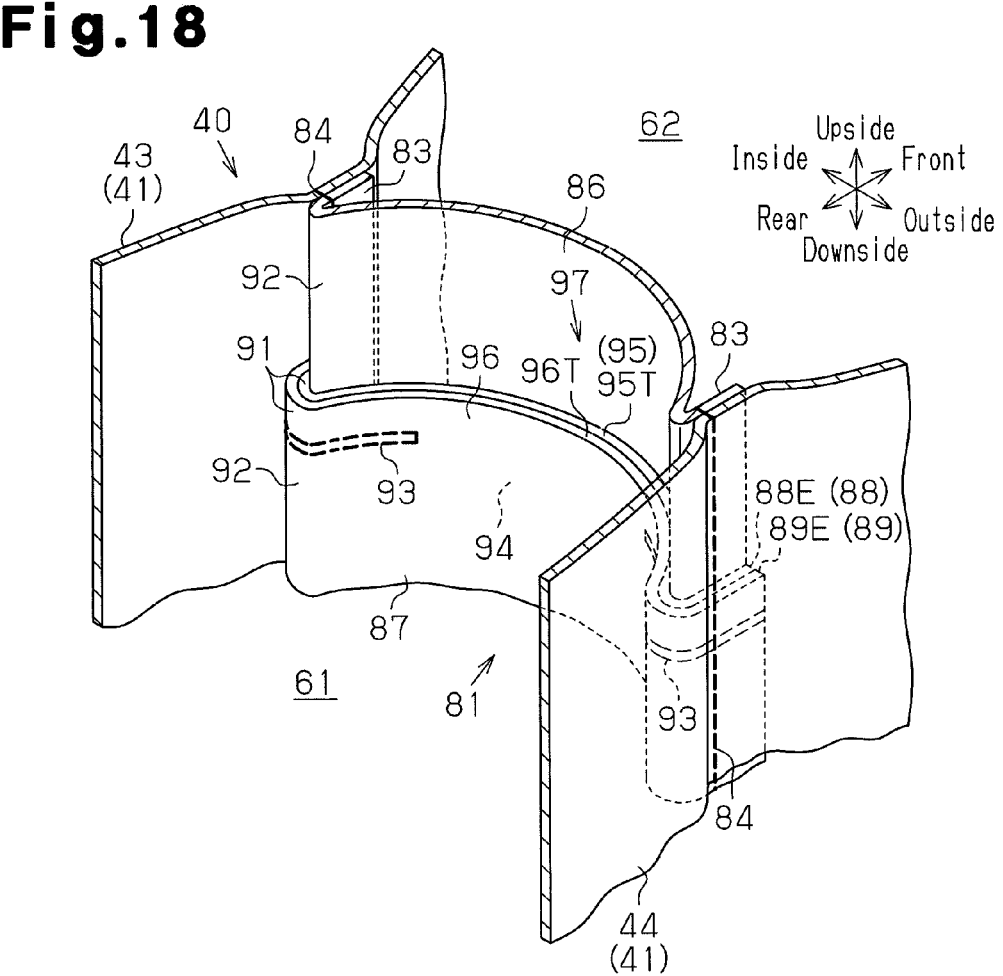
FIG. 18 is a partial perspective view showing a pressure regulator valve and the surroundings when the vertical partition of the first embodiment is tensed.

As illustrated in FIGS. 10 and 18, the vertical partition 81 has two fabric pieces 86, 87, which are arranged in the vertical direction (the up-down direction). The vertical partition 81 is formed of a material such as woven fabric having high strength and flexibility to be easily folded.

The fabric pieces 86, 87 have ends 88, 89 with edges 88E, 89E, respectively. In a state in which the edges 88E, 89E are matched with each other as shown in FIG. 18, the ends 88, 89 are overlaid onto each other to form a pair of overlapping portions 91. The fabric pieces 86, 87 are joined to each other at the inner joint portion 93, which extends in the lateral direction (the vehicle widthwise direction) at the boundary between the overlapping portions 91 and the remaining parts (hereinafter, referred to as non-overlapping portions 92). The boundary is displaced from the edges 88E, 89E in one of the upward and downward directions (the downward direction in the first embodiment) by a predetermined distance. The inner joint portion 93 is formed by sewing the fabric pieces 86, 87. The inner joint portion 93 may be formed by adhesion with an adhesive.

Further, as shown in FIGS. 5A, 5B, and 7, an inner tube 101 is arranged in a rear end portion of the airbag main body 41 in the uninflated and deployed state. Also, the inner tube 101 is also located below the insertion port 51. The inner tube 101 wraps the lower half of the inflator 31, which includes the gas outlet 31A, and the lower half of the retainer 32, which includes the window 33. The inner tube 101 regulates the flow of the inflation gas discharged by the inflator 31 through the gas outlet 31A such that a greater amount of the discharged gas is supplied to the third inflation chamber 63 than to the first inflation chamber 61. That is, the inner tube 101 regulates the flow of the inflation gas to supply the inflation gas preferentially to the third inflation chamber 63 compared to the first inflation chamber 61.

Like the airbag main body 41, the inner tube 101 is formed by a single fabric piece that is formed of a material such as woven fabric having high strength and flexibility to be easily folded. The fabric piece may be coated with a silicone resin.

The inner tube 101 is formed by folding the single fabric piece along a folding line 102 set at the center portion to be overlaid onto itself in the vehicle widthwise direction, and joining the fabric piece such that the overlaid portions form a tubular shape. The inner tube 101 may also be formed of two fabric pieces divided along the folding line. To distinguish the two overlapped portions of the inner tube 101, the part located on the inner side is referred to as a structural fabric portion 103, and the part located on the outer side is referred to as a structural fabric portion 106.

The inner side structural fabric portion 103 includes a main body forming fabric portion 104, which has a substantially rectangular shape extending substantially in the up-down direction, and an extension 105, which extends forward and downward from the lower end of the main body forming fabric portion 104. The main body forming fabric portion 104 has a bolt hole 109 at a position that corresponds to the bolt hole 52 of the main body fabric portion 43 (see FIG. 8). In the first embodiment, the bolt hole 109 is formed in the process of installing the inner tube 101 in the airbag main body 41. The extension 105 of the structural fabric portion 103 substantially has the same shape as the inner side extension 68 of the lateral partition 64, which is described above.

The outer side structural fabric portion 106 includes a main body forming fabric portion 107, which has a substantially rectangular shape extending substantially in the up-down direction, and an extension 108, which extends forward and downward from the lower end of the main body forming fabric portion 107. The extension 108 of the structural fabric portion 106 substantially has the same shape as the outer side extension 71 of the lateral partition 64, which is described above.

The inner tube 101, which is folded in half as described above, is located between the structural fabric portions 66, 69 with the folding line 102 matched with the folding lines 42, 65. The inner tube 101 is joined to the airbag main body 41 and the lateral partition 64 by a center joint portion 111 formed along the folding line 102 (see FIG. 8). The center joint portion 111 is located outside the inflation region in the inflation portion 46. The folded parts of the inner tube 101 are joined to each other by a peripheral joint portion 112, which is provided along the facing peripheral portions of the main body forming fabric portions 104, 107. The upper half of the peripheral joint portion 112 is inclined forward toward the upper end. The lower half of the peripheral joint portion 112 is inclined forward toward the lower end. The peripheral joint portion 112 is bent such that inflation gas that is discharge substantially forward from the gas outlet 31A is adequately distributed to the first inflation chamber 61 and the third inflation chamber 63.

Most of the inflator assembly 30 is arranged to extend substantially in the up-down direction when accommodated in the rear end portion of the airbag main body 41. The upper portion of the inflator assembly 30 extends through insertion port 51 to be exposed to the outside of the airbag main body 41. The bolt 34 of the retainer 32 is passed through the bolt holes 52, 109. Accordingly, the position of the inflator assembly 30 is secured with its position determined relative to the airbag main body 41, the lateral partition 64, and the inner tube 101. In this state, the gas outlet 31A is located at a position that is rearward of the first inflation chamber 61 and in the vicinity of the third inflation chamber 63.

An opening 74 and a check valve 75 are provided in the lateral partition 64 and the inner tube 101. An opening 94 and a pressure regulator valve 97 are provided in the vertical partition 81.

<Opening 74 and Check Valve 75>

As shown in FIGS. 5A, 5B, and 6, the opening 74 connects the lower inflation chamber (the third inflation chamber 63) and the upper inflation chamber (the first inflation chamber 61) with each other.

The joint portion 73 of the lateral partition 64 is disjoined in rear parts of the main body forming fabric portion 67, 70. In other words, the joint portion 73, which joins the main body forming fabric portions 67, 70 to each other, is absent in an area including the folding line 65. In this manner, the opening 74 is formed by a part where the joint portion 73 is not provided and the corresponding part of the inner tube 101.

The check valve 75 regulates flow of inflation gas at the opening 74. The check valve 75 allows inflation gas to flow from the first inflation chamber 61 to the third inflation chamber 63 (inflow), but restricts the flow in the opposite direction (outflow).

The front peripheral portions of the folded extensions 68, 71 and the front peripheral portions of the folded extensions 105, 108 are joined to each other by a joint portion 76 provided along the front peripheral portions. The upper end of the joint portion 76 is connected to the rear end of the joint portion 73. The joint portion 76, together with the joint portion 73, joins the structural fabric portions 66, 69 in the lateral partition 64 to each other along the peripheral portions.

As described above, the check valve 75 is formed by a part of a joint portion (the joint portion 76), and the part of the joint portion (the joint portion 76) also functions to join the front peripheral portion of the inner tube 101 at the intersection with the lateral partition 64 to the structural fabric portions 66, 69 of the lateral partition 64.

Also, the rear portions of the folded extensions 68, 71 and the rear portions of the folded extensions 105, 108 are joined to each other by a joint portion 77 provided along the rear peripheral portions. The joint portions 76, 77 are both located in the inflation region in the inflation portion 46 and inclined downward toward the front ends. In this manner, the inner tube 101 is joined only to the lateral partition 64 by the joint portions 76, 77 in the inflation region in the inflation portion 46.

Further, parts of the folded extensions 68, 71 that are rearward of the joint portion 77 and parts of the folded extension 105, 108 that are rearward of the joint portion 77 are joined (sewn) to each other by the peripheral joint portion 45, together with the rear lower ends of the main body fabric portions 43, 44. Parts of the inner side extensions 68, 105 that are surrounded by the opening 74 and the joint portions 76, 77 form a valve body 78 on one side (inner side in the vehicle) of the check valve 75. Also, parts of the outer side extensions 71, 108 that are surrounded by the opening 74 and the joint portions 76, 77 form a valve body 79 on the other side (outer side in the vehicle) of the check valve 75.

The check valve 75 allows flow of inflation gas when one of the valve bodies 78, 79 is separated from the other. This state of the check valve 75 is referred to as a valve opening state. The check valve 75 restricts flow of inflation gas when the valve bodies 78, 79 contact each other in at least parts thereof. This state of the check valve 75 is referred to as a valve closing state.

<Opening 94 and Pressure Regulator Valve 97>

As shown in FIGS. 5A, 5B, and 18, the opening 94 and the pressure regulator valve 97 are located substantially at a center in the vertical direction and the lateral direction. Specifically, the inner joint portion 93 in the vertical partition 81 is disjoined at a part (an area including the folding line 82 in the first embodiment). In other words, the inner joint portion 93, which joins the fabric pieces 86, 87 to each other, is absent at a part that extends across the folding line 82 in the boundary between the overlapping portions 91 and the non-overlapping portions 92. In this manner, a part where the inner joint portion 93 is not provided forms the opening 94. The opening 94 is a slit that extends in the lateral direction (the vehicle widthwise direction) and connects the first inflation chamber 61 and the second inflation chamber 62 to each other. The lateral direction (the vehicle widthwise direction) is the same as the direction in which the impact is applied to the vehicle 10.

The pressure regulator valve 97 adjusts the flow of inflation gas at the opening 94, thereby regulating the internal pressures in the first inflation chamber 61 and the second inflation chamber 62. More specifically, the pressure regulator valve 97 is closed before the first inflation chamber 61 is inflated and restrains the occupant P, thereby restricting the outflow of inflation gas from the first inflation chamber 61 to the second inflation chamber 62 through the opening 94. When the first inflation chamber 61 restrains the occupant P, the pressure regulator valve 97 opens in response to a change in the tensed state of the vertical partition 81 due to the applied external force generated by the restraint, thereby cancelling the restraint.

A part of the overlapping portion 91 that is between the opening 94 and the edge 88E forms a valve body 95 of the pressure regulator valve 97, and a part of the overlapping portion 91 that is between the opening 94 and the edge 89E forms a valve body 96 of the pressure regulator valve 97. When the valve bodies 95, 96 contact each other at least partially, for example, at the distal ends 95T, 96T, the flow of the inflation gas through between the valve bodies 95, 96 is restricted (see FIGS. 19A, 19B). This state of the pressure regulator valve 97 is referred to as a valve closing state. Also, when the opening 94 is opened, and the entire valve body 95 is separated from the entire valve body 96, inflation gas is allowed to flow through between the valve bodies 95, 96 (see FIG. 19C). This state of the pressure regulator valve 97 is referred to as a valve opening state.

Further, the overlapping portions 91, which have the valve bodies 95, 96, are located in the first inflation chamber 61 before the inflation portion 46 is deployed and inflated.

At the boundary between the overlapping portions 91 and the non-overlapping portions 92, the overlapping portions 91 are folded upward or downward (upward in the first embodiment) to be overlaid onto one of the non-overlapping portions 92. Further, the folded band-like overlapping portions 91 are joined (sewn) to the main body fabric portions 43, 44 of the airbag main body 41 and the non-overlapping portions 92 at the ends in the extending direction of the inner joint portion 93 (the lateral direction, the vehicle widthwise direction) by the outer joint portions 84 (see FIGS. 5A and 18).

The airbag 40 of the first embodiment is constructed as described above. A method for manufacturing the airbag 40 will now be described with reference to FIGS. 7 to 12. Particularly, a method for providing the lateral partition 64 and the vertical partition 81 between the main body fabric portions 43, 44 will be described. In the manufacture, the following first to fifth joining steps are sequentially performed.

<First Joining Step>

As shown in FIG. 7, the airbag main body 41 and the lateral partition 64 are spread in the first joining step. The slit 47, the reinforcement loop portion 48, the bolt holes 52, and the reinforcement loop portions 53 are formed in the airbag main body 41 in advance.

With the folding line 65 matched with the folding line 42, the lateral partition 64 is overlaid onto a lower part of the airbag main body 41. Specifically, the inner side structural fabric portion 66 is overlaid onto a lower part of the corresponding main body fabric portion 43, and the outer side structural fabric portion 69 is overlaid onto a lower part of the corresponding main body fabric portion 44.

The inner side main body forming fabric portion 67 is sewn at its upper peripheral portion to the main body fabric portion 43, and the outer side main body forming fabric portion 70 is sewn at its upper peripheral portion to the main body fabric portion 44. The outer joint portion 72 is thus formed.

<Second Joining Step>

Figure 8:
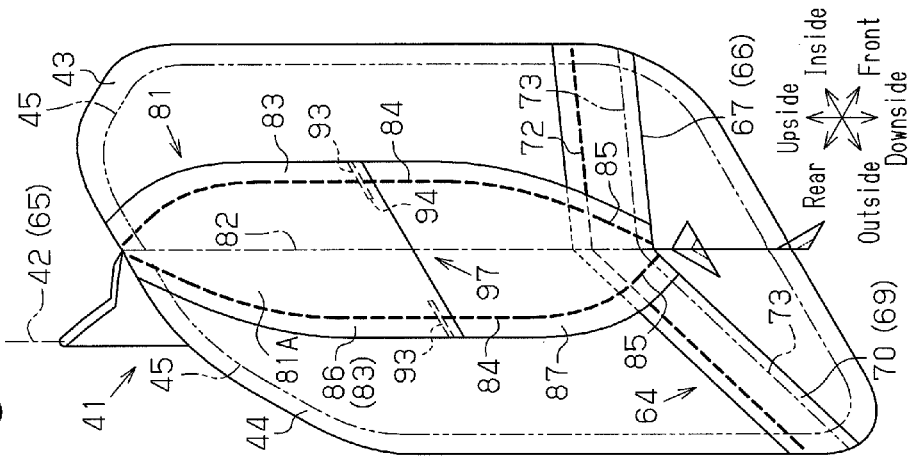
FIG. 8 is an explanatory partial perspective view showing a second joining step of the airbag according to the first embodiment.

As shown in FIGS. 7 and 8, the lateral partition 64 and the airbag main body 41 are spread in the second joining step. The inner tube 101 is also spread.

With the folding line 102 matched with the folding lines 42, 65, the inner tube 101 is overlaid onto the airbag main body 41 and the lateral partition 64. Specifically, the inner side structural fabric portion 103 is overlaid onto the corresponding main body fabric portion 43 and the structural fabric portion 66, and the outer side structural fabric portion 106 is overlaid onto the corresponding main body fabric portion 44 and the structural fabric portion 69.

The inner tube 101 is sewn to the airbag main body 41 and the lateral partition 64 along the folding line 102, so that the center joint portion 111 is formed. The thus formed center joint portion 111 attaches the spread inner tube 101 to the airbag main body 41 and the lateral partition 64, while determining the relative positions.

In the inner side structural fabric portion 103, the bolt hole 109 is formed at a part that is below the main body fabric portion 43 and corresponds to one of the bolt holes 52.

Figure 9:
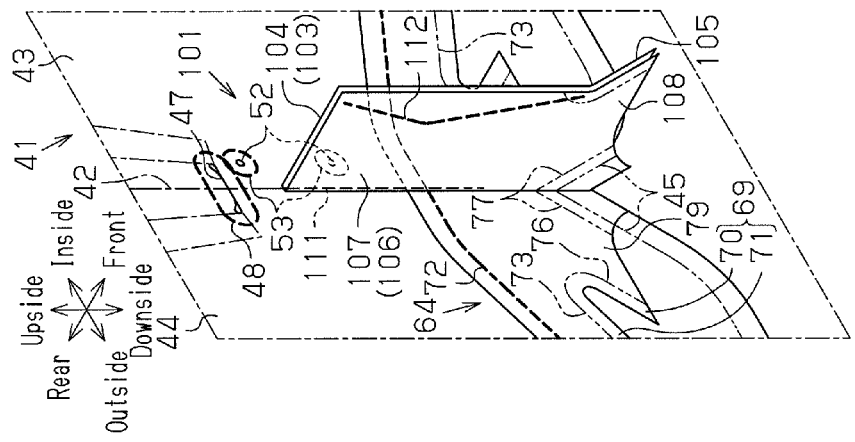
FIG. 9 is an explanatory partial perspective view showing a second joining step of the airbag according to the first embodiment.

As shown in FIG. 9, the inner tube 101 is folded in half along the folding line 102 (refer to FIG. 8), and the structural fabric portion 103 and the structural fabric portion 106 are overlaid onto each other. The main body forming fabric portions 104, 107 are sewn to each other at the facing peripheral portions, so that the peripheral joint portion 112 is formed. The peripheral joint portion 112 joins the main body forming fabric portion 104, 107 to each other, so that the inner tube 101 has a tubular shape.

<Third Joining Step>

As shown in FIG. 10, the rear part of the airbag main body 41 and the rear part of the lateral partition 64 are folded in half along the folding lines 42, 65 in the third joining step. The airbag main body 41 except for the rear part and the lateral partition 64 except for the rear part are spread.

The spread vertical partition 81 is overlaid onto the partly spread airbag main body 41 and the partly spread lateral partition 64. The vertical partition 81 is formed by a pair of upper and lower fabric pieces 86, 87, which are joined to each other by the inner joint portion 93, and includes the opening 94 and the pressure regulator valve 97.

Parts of the peripheral portions 83 of the vertical partition 81 that are not laid on the structural fabric portions 66, 69 are sewn to the main body fabric portions 43, 44, so that a pair of the outer joint portions 84 is formed. Also, parts of the peripheral portions 83 of the vertical partition 81 that are laid on the structural fabric portions 66, 69 are sewn only to the main body forming fabric portions 67, 70, so that a pair of the outer joint portions 85 is formed. The outer joint portions 84 may be formed either before or after the outer joint portions 85 are formed.

<Fourth Joining Step>

Figure 11:
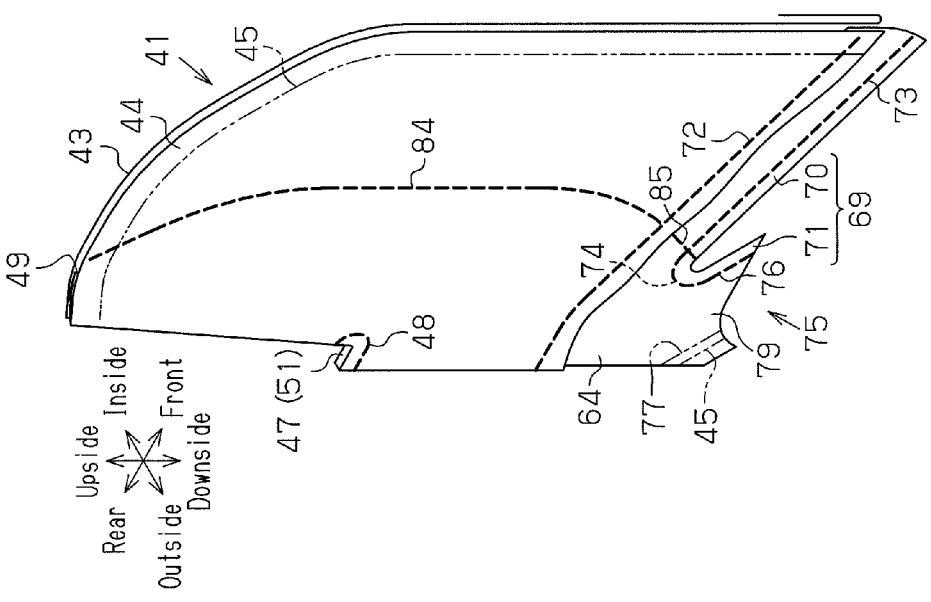
FIG. 11 is an explanatory partial perspective view, with a part of the main body fabric portion cut away, showing a fourth joining step of the airbag according to the first embodiment.

In the fourth joining step, the partly spread portions in the third joining step (the airbag main body 41, the lateral partition 64, and the vertical partition 81) are folded in half along the folding line 82 (see FIG. 10) as shown in FIG. 11. In this state, the lower peripheral portions of the main body forming fabric portions 67, 70 are sewn to each other to form the joint portion 73 and the opening 74. The front peripheral portions of the extensions 68, 71, 105, 108 are sewn together to form the joint portion 76, and the rear peripheral portions are sewn together to form the joint portion 77. As the joint portions 76, 77 are formed, the check valve 75, which has the valve bodies 78, 79, is formed at the intersection of the lateral partition 64 and the inner tube 101. When the check valve 75 is formed, the front peripheral portion of the part of the inner tube 101 that intersects with the lateral partition 64 is simultaneously joined to the structural fabric portions 66, 69.

At the fourth joining step, as shown in FIG. 11, parts of the main body fabric portions 43, 44 that are below the outer joint portion 72 are folded upward and outward so that the lateral partition 64 is exposed. In FIG. 11, the outer side main body fabric portion 44 is shown with a part cut away.

As described above, the inner tube 101 is joined to the lateral partition 64 in the inflation region of the inflation portion 46, but is not joined to the main body fabric portions 43, 44. Therefore, unlike a case in which an inner tube is joined to a main body fabric portion and a lateral partition in an inflation region of an inflation portion, the movement of the inner tube 101 is not likely to be restricted when the inner tube 101 is joined to the lateral partition 64. The inner tube 101 can therefore by easily joined to the lateral partition 64.

<Fifth Joining Step>

Figure 12:
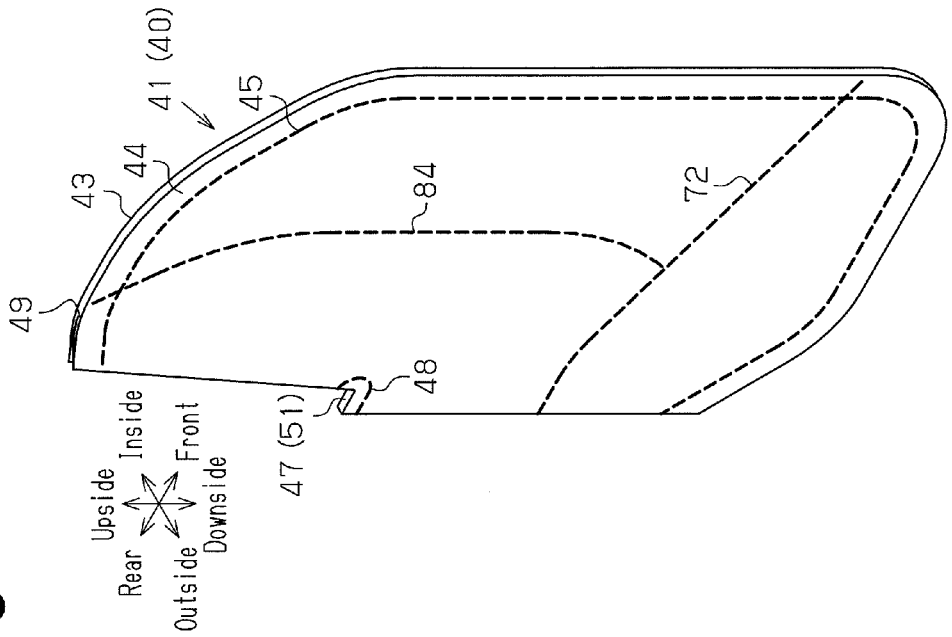
FIG. 12 is an explanatory perspective view showing a fifth joining step of the airbag according to the first embodiment.

In the fifth joining step, parts of the main body fabric portions 43, 44 that are above the slit 47 are folded into the remaining parts, so that the inward folding portion 49 is formed as shown in FIGS. 11 and 12. In this state, the peripheries of the main body fabric portions 43, 44 are sewn together to from the peripheral joint portion 45. The peripheral joint portion 45 joins the main body fabric portions 43, 44 to each other and joins (sews) the upper end of the inward folding portion 49 to the remaining parts of the main body fabric portions 43, 44. In addition, the front ends of the main body forming fabric portions 67, 70 of the lateral partition 64 are joined (sewn) to the front ends of the main body fabric portions 43, 44, and the parts of the extension 68, 71, 105, 108 that are rearward of the joint portion 77 are joined (sewn) to the rear lower ends of the main body fabric portions 43, 44. Further, the upper end of the folded vertical partition 81 is joined (sewn) to the upper ends of the main body fabric portions 43, 44.

In this manner, the airbag 40 is formed, which includes the lateral partition 64 and the vertical partition 81, which extend between the main body fabric portions 43, 44, and the inner tube 101, which intersects with the lateral partition 64. As shown in FIG. 12, the peripheral joint portion 45, a part of the reinforcement loop portion 48, and the outer joint portions 72, 84 are exposed on the surface of the outer side main body fabric portion 44 of the airbag 40. Also, the reinforcement loop portions 53 is exposed on the surface of the inner side main body fabric portion 43, in addition to the peripheral joint portion 45, a part of the reinforcement loop portion 48, and the outer joint portion 72, 84.

Since the airbag 40 in the uninflated and deployed state (see FIGS. 4, 5A and 5B) is folded as shown in FIG. 3, the airbag module AM is compact in size (hereinafter, referred to as a storage form). The airbag module AM is folded in this manner in order that it is suitable for being accommodated in the storage portion 21, which has a limited size in the seat back 14.

The bolts 34 extend from the retainer 32 and are passed through the airbag main body 41 (the main body fabric portion 43) and are passed through the side frame portion 17. A nut 35 is threaded onto each bolt 34. The fastening secures the inflator assembly 30 to the side frame portion 17 together with the airbag 40.

The inflator assembly 30 may be fixed to the side frame portion 17 using members other than the bolt 34 and the nut 35.

As shown in FIG. 1, the side airbag apparatus includes an impact sensor 121 and a controller 122 in addition to the above-described airbag module AM. The impact sensor 121 includes an acceleration sensor and is provided on the body side portion 11 of the vehicle 10 (see FIG. 2). The impact sensor 121 detects an impact applied on the body side portion 11 from the side. The controller 122 controls the operation of the inflator 31 based on a detection signal that impact sensor 121 outputs when detecting an impact.

Furthermore, the vehicle 10 is equipped with a seat belt apparatus for restraining the occupant P seated on the vehicle seat 12. However, illustration of the seat belt apparatus is omitted in the drawings.

The side airbag apparatus of the first embodiment is constructed as described above. The typical operation mode will now be described as operation of the side airbag apparatus according to the first embodiment.

Figures 19A, 19B, 19C:
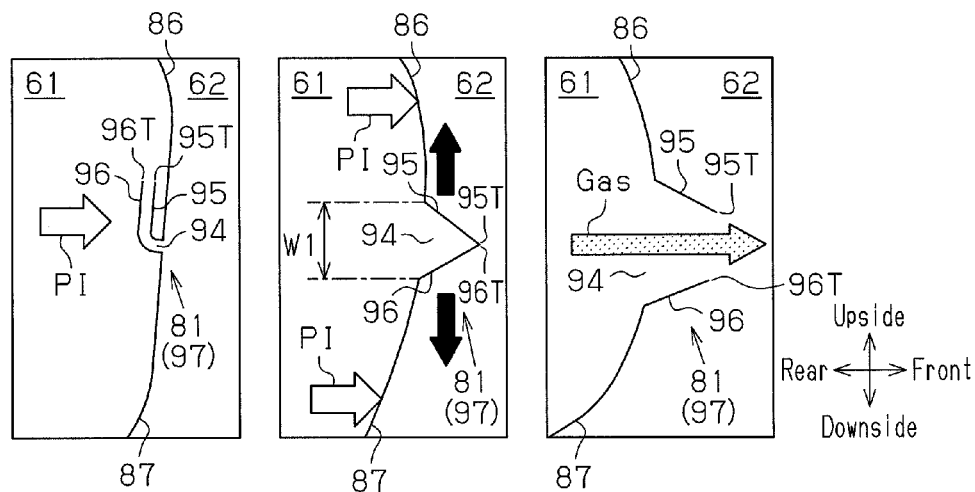
FIGS. 19A to 19C are cross-sectional side views schematically showing operation of the pressure regulator valve of the first embodiment.

FIGS. 19A to 19C schematically show the forms of the pressure regulator valve 97 and the vertical partition 81 being changed over time after the inflation gas starts to be supplied. Detailed parts are omitted or simplified in FIGS. 19A to 19C.

In the side airbag apparatus of the first embodiment, when no impact is applied to the body side portion 11 of the vehicle 10, for example, due to a side collision, the controller 122 sends no activation signal to the inflator 31. Thus, the inflator 31 does not discharge inflation gas. The airbag 40 thus remains stored in the storage portion 21 in the storage form (see FIG. 3).

In contrast, when the impact sensor 121 detects that an impact of a magnitude greater than or equal to a predetermined value has been applied to the body side portion 11 of the vehicle 10 due to a side collision or the like while the vehicle 10 is running, the impact sensor 121 outputs a detection signal. Based on the detection signal, the controller 122 sends an activation signal to the inflator 31 to activate the inflator 31 (see FIGS. 1 and 2). In response to the activation signal, the gas generating agent in the inflator 31 generates high temperature and pressure inflation gas, which is discharged through the gas outlet 31A. Some of the inflation gas substantially forward via the window 33 of the retainer 32, which is shown in FIG. 5A, and then strikes the front wall (the peripheral joint portion 112) of the inner tube 101. This changes the direction of the flow to upward and downward directions. The inflation gas that has been guided upward by the inner tube 101 flows into the first inflation chamber 61 via the upper opening of the inner tube 101. The inflation gas thus starts inflating the first inflation chamber 61.

The inflation gas discharged from the lower open end 32A of the retainer 32 and the inflation gas guided downward by the inner tube 101 flow toward the check valve 75. The amount of this part of the inflation gas is greater than the amount of inflation gas delivered to the first inflation chamber 61.

During the period in which inflation gas is being supplied to the check valve 75, a force that acts to separate the valve bodies 78, 79 from each other is generated in the valve bodies 78, 79. The inflation gas therefore flows into the third inflation chamber 63 through the opening 74 and through between the valve bodies 78, 79, which starts inflating the third inflation chamber 63. The lateral partition 64 is pulled in the lateral direction (the vehicle widthwise direction) by parts of the main body fabric portions 43, 44 that form the first inflation chamber 61 and the third inflation chamber 63. The continuous supply of the inflation gas from the inflator 31 increases the internal pressure of the third inflation chamber 63.

The lower end of the inner tube 101 intersects with the lateral partition 64. When the inflation gas discharged from the gas outlet 31A of the inflator flows into the third inflation chamber 63, the inflation gas passes through a part of the inner tube 101 that intersects with the lateral partition 64 and acts to flap the intersecting part. However, the intersecting part is restricted from moving by a part of the peripheral joint portion 45, the rear peripheral portion of which is joined to the main body fabric portions 43, 44, and by a part of the joint portion (joint portion 76), the front peripheral portion of which is joined to the structural fabric portions 66, 69. In this manner, the intersecting part of the inner tube 101 is restricted from moving at the front and rear ends. The intersecting part is therefore unlikely to be flapped.

As the first inflation chamber 61 starts being inflated, the folded vertical partition 81 is pulled in the lateral direction (the vehicle widthwise direction) by the parts of the main body fabric portions 43, 44 that form the first inflation chamber 61. As shown in FIG. 19A, an internal pressure PI is applied to the valve bodies 95, 96 of the pressure regulator valve 97 in the overlapping direction (the thickness direction). The internal pressure PI is not as high as the internal pressure of the first inflation chamber 61 when restraining the occupant P or as the internal pressure of the third inflation chamber 63. The valve bodies 95, 96 are brought into close contact in the entire surfaces with each other by the internal pressure PI, and are in a self-sealing state, which restricts the flow of the inflation gas through between the valve bodies 95, 96. Furthermore, the overlapping portions 91, which has been folded and overlaid onto the non-overlapping portion 92 of the vertical partition 81, is pressed against the non-overlapping portion 92 by the internal pressure (see FIG. 18). This allows the valve bodies 95, 96 to be further easily closed.

As shown in FIG. 6, the vertical partition 81 is formed to be longer in the vertical direction (the up-down direction) than in the lateral direction (the vehicle widthwise direction). Thus, in the vertical partition 81, stronger tension tends to be applied in the lateral direction (the vehicle widthwise direction) than in the longitudinal direction (the up-down direction). In the first embodiment, since the opening 94 extends in the lateral direction (the vehicle widthwise direction), in which the strong tension tends to be applied, the opening 94 is easily closed.

Further, when the first inflation chamber 61 is deployed and inflated, strong tension is applied not only to the vertical partition 81 in the lateral direction (the vehicle widthwise direction), but also to the overlapping portions 91 of the vertical partition 81 in the same direction. This is because the ends of the overlapping portions 91 are joined to the main body fabric portions 43, 44.

When the valve bodies 95, 96 at least partially contact each other, the pressure regulator valve 97 is closed. The inflation gas in the first inflation chamber 61 is restricted from flowing into the second inflation chamber 62 through between the valve bodies 95, 96 and the opening 94. The restriction of gas flow causes the inflation gas to be accumulated in the first inflation chamber 61, so that the internal pressure of the first inflation chamber 61 is mainly increased.

In the first embodiment, the upper inflation space above the lateral partition 64 is divided into the first inflation chamber 61 and the second inflation chamber 62 by the vertical partition 81. That is, the volume of the first inflation chamber 61 is smaller than that of the upper inflation space when it is not divided. Therefore, the internal pressure of the first inflation chamber 61 is increased more quickly than in the case where the upper inflation space is not divided. At this time, the inflation portion 46 is yet to contact the occupant P.

Figure 17:
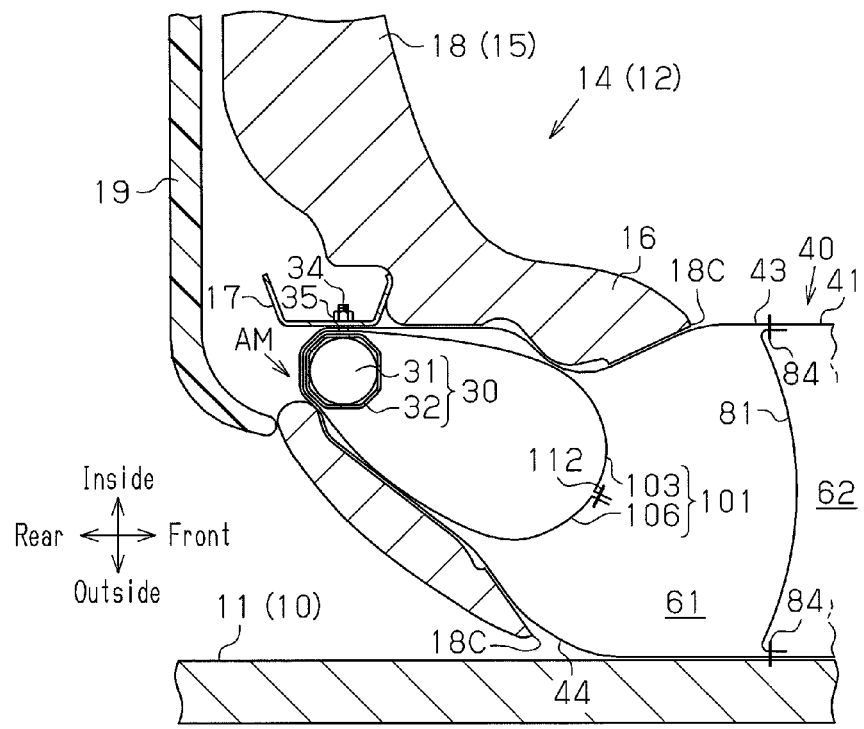
FIG. 17 is a partial cross-sectional plan view illustrating a state in which the airbag of FIG. 3 has been projected from the vehicle seat to be deployed and inflated with a part remaining in the seat back.

When the internal pressures increase and the first inflation chamber 61 and the third inflation chamber 63 are inflated, while being unfolded (deployed) in the reverse order of the folding order, the seat pad 18 of the seat back 14 is pushed by the first inflation chamber 61 and the third inflation chamber 63 and breaks at the breakable portion 23 (see FIG. 3). As shown in FIG. 17, the first inflation chamber 61 and the third inflation chamber 63 are projected forward from the seat back 14 through the broken part while parts thereof are remaining in the storage portion 21.

In the first embodiment, the inner tube 101 is joined only to the lateral partition 64 in the inflation region in the inflation portion 46. Therefore, unlike Patent Document, in which the inner tube 166 is joined to the main body fabric portions 162 in the inflation region, the inflation of the first inflation chamber 61 (the upper inflation chamber) and the third inflation chamber 63 (the lower inflation chamber) are unlikely to be hindered by the inner tube 101.

Inflation gas continues to be supplied to the first and third inflation chambers 61, 63 after the first and third inflation chambers 61, 63 are projected. Accordingly, the first inflation chamber 61 and the third inflation chamber 63 are deployed while being unfolded forward between the body side portion 11 and the upper body (the shoulder region PS, the rear half of the thorax PT, and the lumbar region PP) of the occupant P seated in the vehicle seat 12 as indicated by broken lines in which a long dash alternates with a pair of short dashes in FIG. 2. As shown in FIGS. 5A and 5B, the third inflation chamber 63, the internal pressure of which is higher than that of the first inflation chamber 61, is deployed and inflated beside the lumbar region PP. Also, the first inflation chamber 61, the internal pressure of which is lower than that of the third inflation chamber 63, is deployed and inflated beside the shoulder region PS and the rear half of the thorax PT. At this time, the second inflation chamber 62 is yet to be inflated or only slightly inflated with a low internal pressure.

As shown in FIG. 18, the vertical partition 81 is tensed when pulled in the lateral direction (the vehicle widthwise direction). The tensed vertical partition 81 limits the thickness of the inflated first inflation chamber 61 in the same direction. In this state, the thickness is greater than that in a case in which the inflation portion 46 is divided into the first inflation chamber 61 and the second inflation chamber 62, for example, by sewing and without using fabric pieces.

Also, as shown in FIG. 20, the lateral partition 64 is tensed when pulled in the lateral direction (the vehicle widthwise direction). The tensed lateral partition 64 limits the thickness of the inflated first and third inflation chambers 61, 63 in the same direction. In this state, the thickness is greater than that in a case in which the inflation portion 46 is divided into the first inflation chamber 61 and the third inflation chamber 63, for example, by sewing and without using fabric pieces.

When the body side portion 11 bulges further inward, the shoulder region PS of the occupant P starts being pushed toward the center of the vehicle by the first inflation chamber 61.

As the first inflation chamber 61 pushes the shoulder region PS and the rear half of the thorax PT and as the third inflation chamber 63 pushes the lumbar region PP, the occupant P is moved inward and restrained. By this movement, the distance between the occupant P and the body side portion 11 is increased, and the space for deploying and inflating the second inflation chamber 62 is ensured.

At the pushing action, only the first inflation chamber 61 of the upper inflation chambers is deployed and inflated. The occupant P thus mostly contacts the first inflation chamber 61 while receiving the pressure of the inflation portion 46.

The inflation gas keeps being supplied to the first inflation chamber 61 with the valve bodies 95, 96 closely contacting each other in the entire surfaces (closed). At this time, external force applied to the inflation portion 46 from the body side portion 11 causes the pressure regulator valve 97 to start opening.

That is, from the middle of the supplying period of the inflation gas to the upper inflation chambers, the inflation portion 46 starts being deformed by external force as the occupant P is restrained. Accordingly, the tension strongly applied to the vertical partition 81 in the lateral direction (the vehicle widthwise direction) is decreased, and the tension applied in the vertical direction (the up-down direction) is increased.

Also, the internal pressure PI of the first inflation chamber 61 is further increased in accordance with the deformation of the inflation portion 46, and the vertical partition 81 is pushed toward the second inflation chamber 62 (see FIG. 19B). Thus, the tension acting on the vertical partition 81 is changed to reduce the difference between the tension in the vertical direction and the tension in the lateral direction. Then, the opening 94 is permitted to be deformed, and the valve bodies 95, 96 are permitted to operate.

The overlapping portions 91 are overlapped with the non-overlapping portions 92, and are joined to the main body fabric portions 43, 44 by the outer joint portions 84 at the ends in the lateral direction (the widthwise direction). Therefore, the force that acts to maintain the overlapped state is strong at the parts of the overlapping portions 91 close to the outer joint portions 84. However, the force is reduced as the distance from the outer joint portions 84 is increased, and the force is minimized at the center in the lateral direction (the vehicle widthwise direction), that is, on the valve bodies 95, 96. Thus, the overlapping portions 91, which are pulled in the vertical direction (the up-down direction), are deformed in the vertical direction at the valve bodies 95, 96 and in the vicinity thereof.

When the opening 94 is opened in the vertical direction (the up-down direction) by a certain amount, the valve bodies 95, 96 of the overlapping portions 91 receive the high internal pressure PI of the first inflation chamber 61 as shown in FIG. 19B and are pushed out (reversed) into the second inflation chamber 62 via the opening 94. When the vertical width W1 of the opening 94 is narrow, the distal ends 95T, 96T contact each other to close the pressure regulator valve 97.

When the width W1 of the opening 94 is increased, the distal ends 95T, 96T separate from each other as shown in FIG. 19C, and the pressure regulator valve 97 is opened. When the pressure regulator valve 97 is opened and the flow restriction is cancelled, the inflation gas in the first inflation chamber 61 is permitted to flow through the opening 94 and between the valve bodies 95, 96 into the second inflation chamber 62.

As the inflation gas starts flowing out as described above, the internal pressure of the first inflation chamber 61, which has been increasing, starts decreasing. However, since the body side portion 11 continues bulging inward, the inflation portion 46 is pushed against the occupant P at the first inflation chamber 61.

Also, the inflow of the inflation gas to the second inflation chamber 62 starts inflating the second inflation chamber 62, and the internal pressure of the second inflation chamber 62 starts increasing, accordingly. This causes the second inflation chamber 62 to be unfolded (deployed) in the reverse order of that in which it was folded.

At this time, the second inflation chamber 62 is deployed and inflated beside the front half of the thorax PT with an internal pressure lower than that of the first inflation chamber 61. The thorax PT has a lower impact resistance than that of the shoulder region PS. In this state, the first inflation chamber 61 and the third inflation chamber 63 have increased the space between the body side portion 11 and the occupant P, and the space for deploying and inflating the second inflation chamber 62 is ensured. Therefore, compared to a case in which such an increase in the space does not takes place, the second inflation chamber 62 can be easily deployed and inflated.

Slightly after the start of increase in the internal pressure of the second inflation chamber 62, the body side portion 11, which is bulging inward, starts pressing the second inflation chamber 62 against the upper body of the occupant P, in addition to the first inflation chamber 61. That is, the upper body of the occupant P starts being restrained by the second inflation chamber 62 in addition to the first inflation chamber 61.

The third inflation chamber 63 is formed to extend over the first inflation chamber 61 and the second inflation chamber 62 in the front-rear direction. The third inflation chamber 63 is therefore deployed and inflated not only below the first inflation chamber 61, but also below the second inflation chamber 62. Thus, compared to a case in which the third inflation chamber 63 is deployed and inflated only below the first inflation chamber 61, the third inflation chamber 63 is deployed and inflated in an area wider forward.

The airbag 40, in which the first inflation chamber 61, the second inflation chamber 62, and the third inflation chamber 63 are each deployed and inflated as described above, is located between the upper body of the occupant P and the inwardly bulging body side portion 11. The airbag 40 pushes the upper body of the occupant P inward of the vehicle and restrains the upper body. The side impact transmitted to the upper body of the occupant P through the body side portion 11 is reduced by the inflation portion 46 and the upper body of the occupant P is protected. Particularly, a range of the lumbar region PP that is large in the front-rear direction is restrained and protected by the third inflation chamber 63, which is deployed and inflated below both the first inflation chamber 61 and the second inflation chamber 62.

The impact resistance of the upper body of the occupant P is generally higher in the rear half of the upper body than in the front half. This is because the rear half includes the spine and the ribs are connected to the spine at the rear ends, while the front ends of the ribs are not connected to any structure having a strength as the spine. Therefore, as the upper inflation chambers are deployed and inflated, the internal pressure of the inflation portion 46 that acts on the side of the upper body of the occupant P is preferably lower in the front half than in the rear half.

In this respect, the upper inflation chambers are inflated such that the vertical partition 81 is located in the vicinity of the boundary between the front half and the rear half of the upper body of the occupant P with respect to the front-rear direction in the present embodiment. When the inflation portion 46 is deployed and inflated, the first inflation chamber 61 is located in the vicinity of the side of the rear half, and the second inflation chamber 62 is located in the vicinity of the side of the front half. Therefore, at an initial stage of the restraint of the occupant P by the airbag 40, the rear half, which has a higher impact resistance than the front half, is pushed by the first inflation chamber 61, the internal pressure of which is increased at an early stage. Also, at the initial stage of the restraint, the front half, which has a relatively low impact resistance, is pressed by the second inflation chamber 62, the internal pressure of which is not as increased as that of the first inflation chamber 61.

When the discharge of inflation gas from the inflator 31 stops and the inflation gas in the third inflation chamber 63 acts to flow to the first inflation chamber 61, the valve bodies 78, 79 of the check valve 75 are pushed by the high pressure in the third inflation chamber 63 and contact each other. Accordingly, the check valve 75 is closed, and the inflation gas in the third inflation chamber 63 is restricted from flowing out (back) to the first inflation chamber 61 through between the valve bodies 78, 79 and the opening 74.

Therefore, the internal pressure of the third inflation chamber 63, which has been increased to a level adequate for protecting the lumbar region PP of the occupant P, is maintained at the high level.

Thereafter, while allowing inflation gas to flow from the first inflation chamber 61 to the third inflation chamber 63, the check valve 75 restricts the inflation gas in the third inflation chamber 63 from flowing out (back) to the first inflation chamber 61. Therefore, if, for example, the internal pressure of the third inflation chamber 63 is increased as the side airbag apparatus restrains the lumbar region PP of the occupant P, the check valve 75 restricts the inflation gas in the third inflation chamber 63 from flowing out to the first inflation chamber 61. The internal pressure of the first inflation chamber 61 is unlikely to be increased under the influence of pressure fluctuation of the third inflation chamber 63 that accompanies the restraint of the lumbar region PP.

The first embodiment as described above has the following advantages.

(1) The inflation portion 46 of the airbag main body 41 is divided into the upper inflation chambers (the first inflation chamber 61, the second inflation chamber 62) and the lower inflation chamber (the third inflation chamber 63) with the lateral partition 64 extending between the main body fabric portions 43 and 44. The airbag main body 41 is formed by a pair of the main body fabric portions 43, 44, the peripheries of which are joined to each other at the peripheral joint portion 45. The inner tube 101 is arranged in the inflation portion 46, and the inner tube 101 wraps at least the gas outlet 31A of the inflator 31. The inner tube 101 extends over the upper inflation chambers and the lower inflation chamber, while intersecting with the lateral partition 64. The rear peripheral portion of the part of the inner tube 101 that intersects with the lateral partition 64 is joined to the main body fabric portions 43, 44 by a part of the peripheral joint portion 45 of the airbag main body 41. In addition, the front peripheral portion of the part of the inner tube 101 that intersects with the lateral partition 64 is joined to the structural fabric portions 66, 69 by a part of the joint portion (the joint portion 76) in the lateral partition 64 (FIG. 5A).

Therefore, movement of the part of the inner tube 101 that intersects with the lateral partition 64 is restricted, from the front and rear, by a part of the peripheral joint portion 45 and a part of the joint portion (the joint portion 76), so that flapping of the part of the inner tube 101 is suppressed. This allows the inflation gas to stably discharged in a predetermined direction from the lower end of the inner tube 101, so that the third inflation chamber 63 (the lower inflation chamber) is stably deployed and inflated. As a result, the third inflation chamber 63 (the lower inflation chamber) restrains and protects the lumbar region PP in a stable manner.

(2) The check valve 75 is provided at the part of the lateral partition 64 that intersects with the inner tube 101 and the part of the inner tube 101 that intersects with the lateral partition 64. The joint portion 76 forms a part of the check valve 75. The front peripheral portion of the part of the inner tube 101 that intersects with the lateral partition 64 is joined to the structural fabric portions 66, 69 by the joint portion 76 (FIG. 5A).

In this manner, the joint portion 76, which is used for forming the check valve 75, joins the front peripheral portion of the intersecting part of the inner tube 101 to the structural fabric portions 66, 69 of the lateral partition 64.

Thus, when the check valve 75 is formed by providing the joint portion 76 at the intersecting portion of the inner tube 101, which intersects with the lateral partition 64, the front peripheral portion of the intersecting portion is simultaneously joined to the structural fabric portions 66, 69. This reduces manufacturing steps for the airbag 40.

(3) The inner tube 101 is joined only to the lateral partition 64 by the joint portion 76 in the inflation region in the inflation portion 46 (FIG. 5A).

Therefore, when the inner tube 101 is joined to the lateral partition 64, the movement of the inner tube 101 is not likely to be restricted by other components of the airbag 40, such as the main body fabric portions 43, 44. This facilitates the process for joining the inner tube 101 to the lateral partition 64, thereby simplifying the manufacture of the airbag 40.

Also, the inflation of the airbag main body 41 is less likely to be hindered by the inner tube 101.

(4) The upper inflation space is divided by the vertical partition 81 into the first inflation chamber 61, to which inflation gas supplied via the inner tube 101, and the second inflation chamber 62, which is located in front of the vertical partition 81. The vertical partition 81 has the opening 94, which connects the first inflation chamber 61 and the second inflation chamber 62 with each other, and the pressure regulator valve 97, which selectively opens and closes the opening 94 to regulate the internal pressures of the first and second inflation chambers 61, 62 (FIGS. 5A and 5B).

By selectively opening and closing the opening 94 by the pressure regulator valve 97, the internal pressures of the first and second inflation chambers 61, 62 can be adjusted to internal pressures adequate for restraining the occupant P to protect him/her from an impact.

Second Embodiment

A side airbag apparatus according to a second embodiment of the present invention will now be described with reference to FIGS. 21 to 27B.

Figure 23:
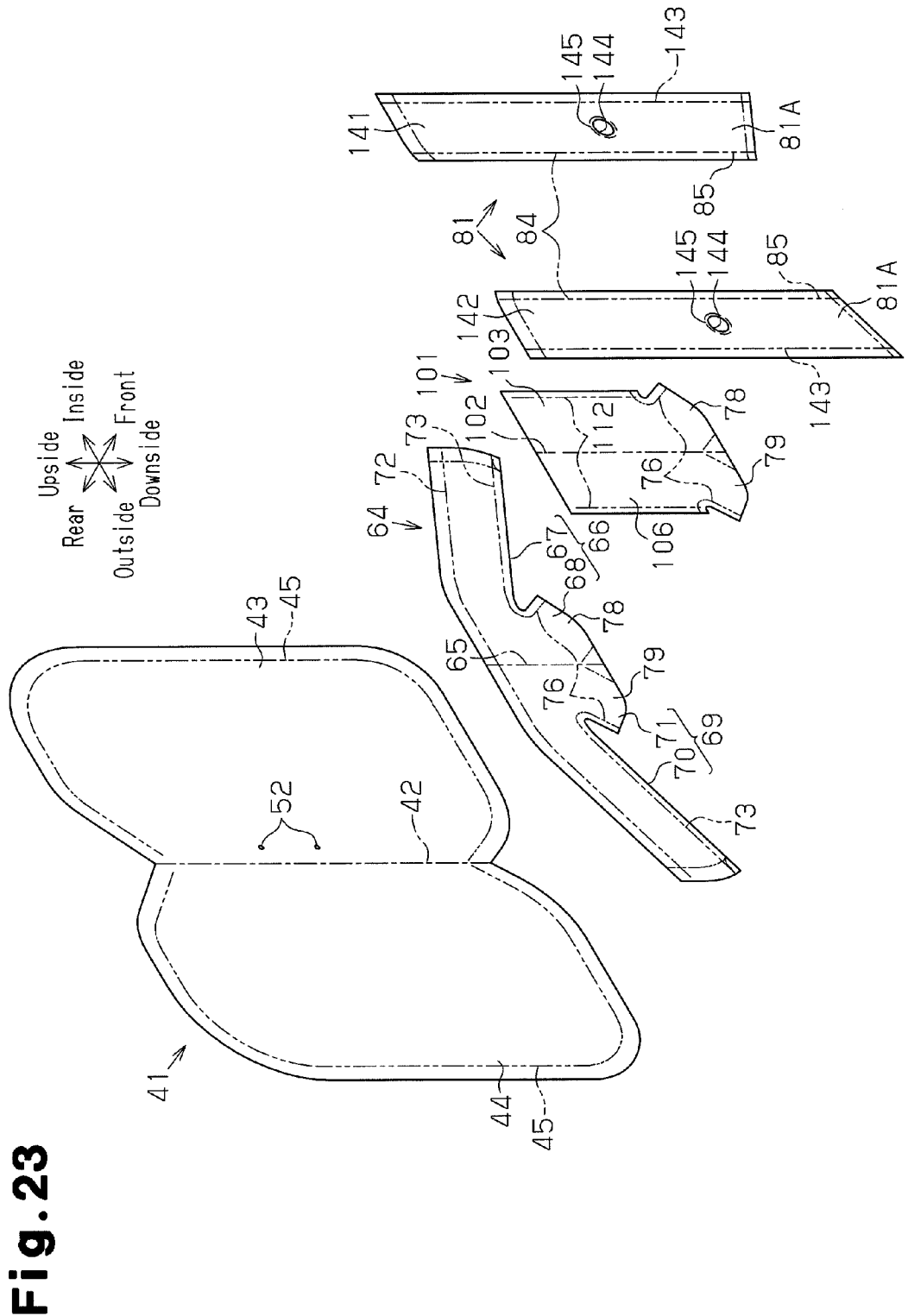
FIG. 23 is an exploded perspective view showing a spread state of the components of the airbag according to the second embodiment.
Figure 24A:
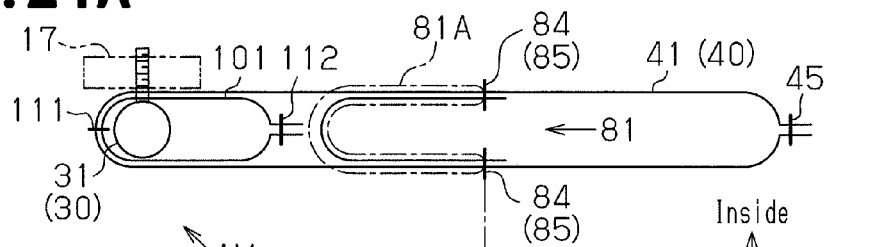
FIG. 24A is a cross-sectional view of the first embodiment schematically showing the arrangement of the inflator, the inner tube, and the vertical partition in the airbag in an uninflated and deployed state.
Figure 24B:
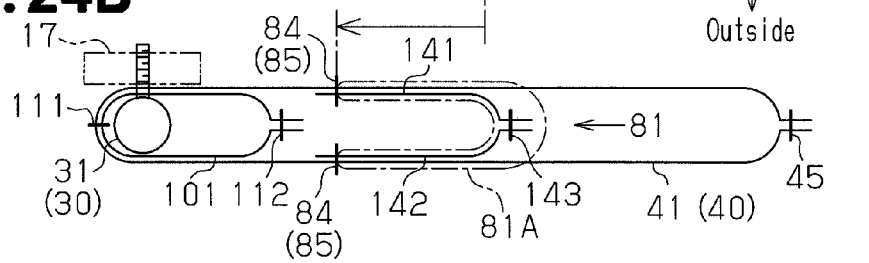
FIG. 24B is a cross-sectional view of the second embodiment schematically showing the arrangement of the inflator, the inner tube, and the vertical partition in the airbag in an uninflated and deployed state.

In the second embodiment, as shown in FIG. 24B, the vertical partition 81 of the airbag main body 41 in an uninflated and deployed state has an area 81A that is located between the outer joint portions 84, 85 on both sides in the vehicle widthwise direction and is folded in half. The area 81A is located forward of the outer joint portions 84, 85. In the first embodiment, the area 81A of the vertical partition 81 is located behind the outer joint portions 84, 85 as shown in FIG. 24A. In the second embodiment, the vertical partition 81 is formed by a pair of independent fabric pieces 141, 142 as shown in FIGS. 21 to 23.

The fabric pieces 141, 142 extend to intersect with the extending direction of the lateral partition 64. That is, the fabric pieces 141, 142 extend substantially in the up-down direction. The fabric pieces 141, 142 are overlaid onto each other in the vehicle widthwise direction when the airbag main body 41 is in an uninflated and deployed state. The upper ends of the fabric pieces 141, 142 are joined (sewn) to the upper ends of the main body fabric portions 43, 44 by the peripheral joint portion 45. The lower ends of the fabric pieces 141, 142 are joined (sewn) to the main body forming fabric portions 67, 70 of the lateral partition 64 by the joint portion 73.

Parts of the fabric pieces 141, 142 that are not overlaid onto the main body forming fabric portions 67, 70 are joined to the main body fabric portions 43, 44 by outer joint portions 84 provided along the rear peripheral portions. Parts of the fabric pieces 141, 142 that are overlaid onto the main body forming fabric portions 67, 70 are joined only to the main body forming fabric portions 67, 70 by outer joint portions 85 provided along the rear peripheral portions. Further, the fabric pieces 141, 142 are joined to each other by a peripheral joint portion 143 provided along the front peripheral portions. The vertical partition 81 is located between the main body fabric portions 43, 44 by the above described joining operation.

At least one of the fabric pieces 141, 142 has a communication hole 144, which connects the first inflation chamber 61 and the second inflation chamber 62 with each other. In the second embodiment, the fabric pieces 141, 142 each have a communication hole 144. The fabric pieces 141, 142 each have a reinforcement loop portion 145 about the communication hole 144. The reinforcement loop portions 145 are formed by sewing the parts about the communication holes 144 in the fabric pieces 141, 142 to reinforce the parts surrounding the communication holes 144.

In the second embodiment, the vertical partition 81 does not have the opening 94 or the pressure regulator valve 97 of the first embodiment.

Other than these differences, the second embodiment is the same as the first embodiment. Thus, like or the same reference numerals are given to those components that are like or the same as the corresponding components described above in the first embodiment and detailed explanations are omitted.

A method for manufacturing the airbag 40 will now be described with reference to FIGS. 25 to 27B.

In the manufacture, steps equivalent to the above described first to fifth joining steps are performed. However, since the fabric pieces 141, 142 need to be coupled to each other when installing the vertical partition 81, an intermediate joining step, which is a combination of the second and third joining steps, is performed between the first and fourth joining steps.
<First Joining Step>

Figure 25:
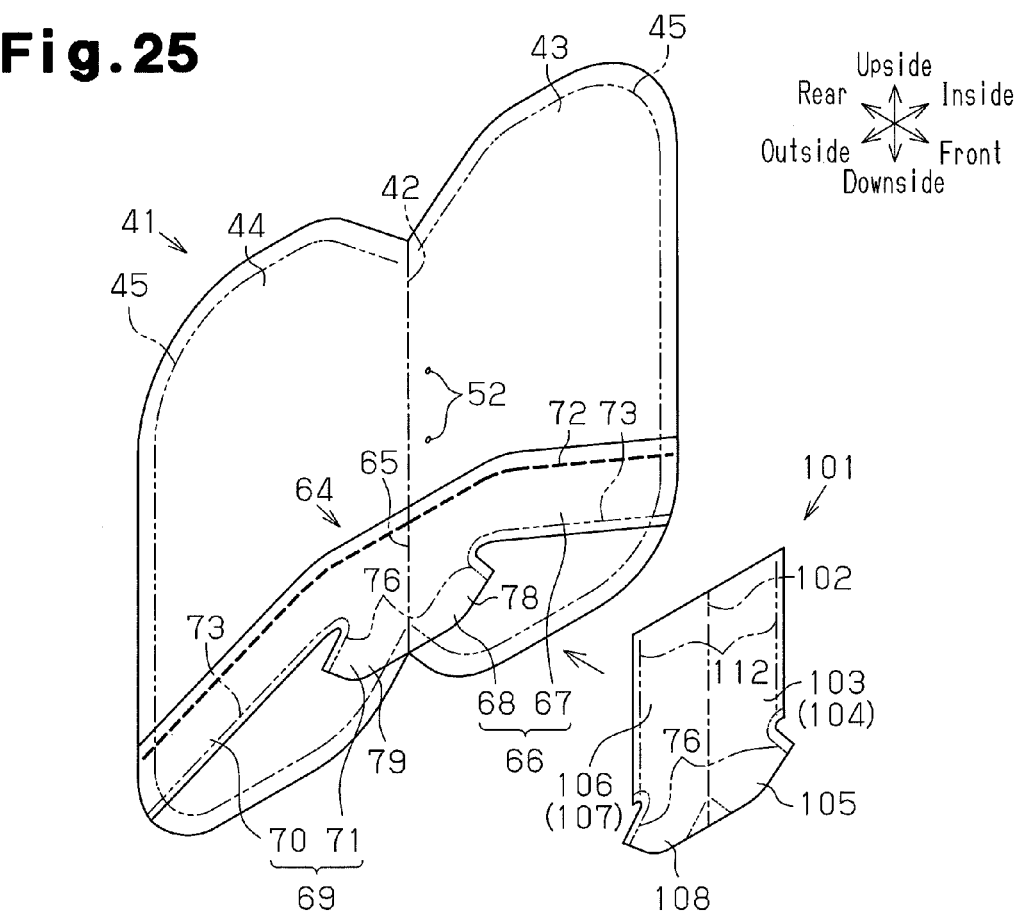
FIG. 25 is an explanatory perspective view showing a first joining step of the airbag according to the second embodiment.

In the first joining step, the lateral partition 64 in a spread state is overlaid onto a lower part of the airbag main body 41 in a spread state as shown in FIG. 25. The inner side main body forming fabric portion 67 is sewn at its upper peripheral portion to the main body fabric portion 43, and the outer side main body forming fabric portion 70 is sewn at its upper peripheral portion to the main body fabric portion 44. The outer joint portion 72 is thus formed.
<Intermediate joining Process>

Figure 26A:
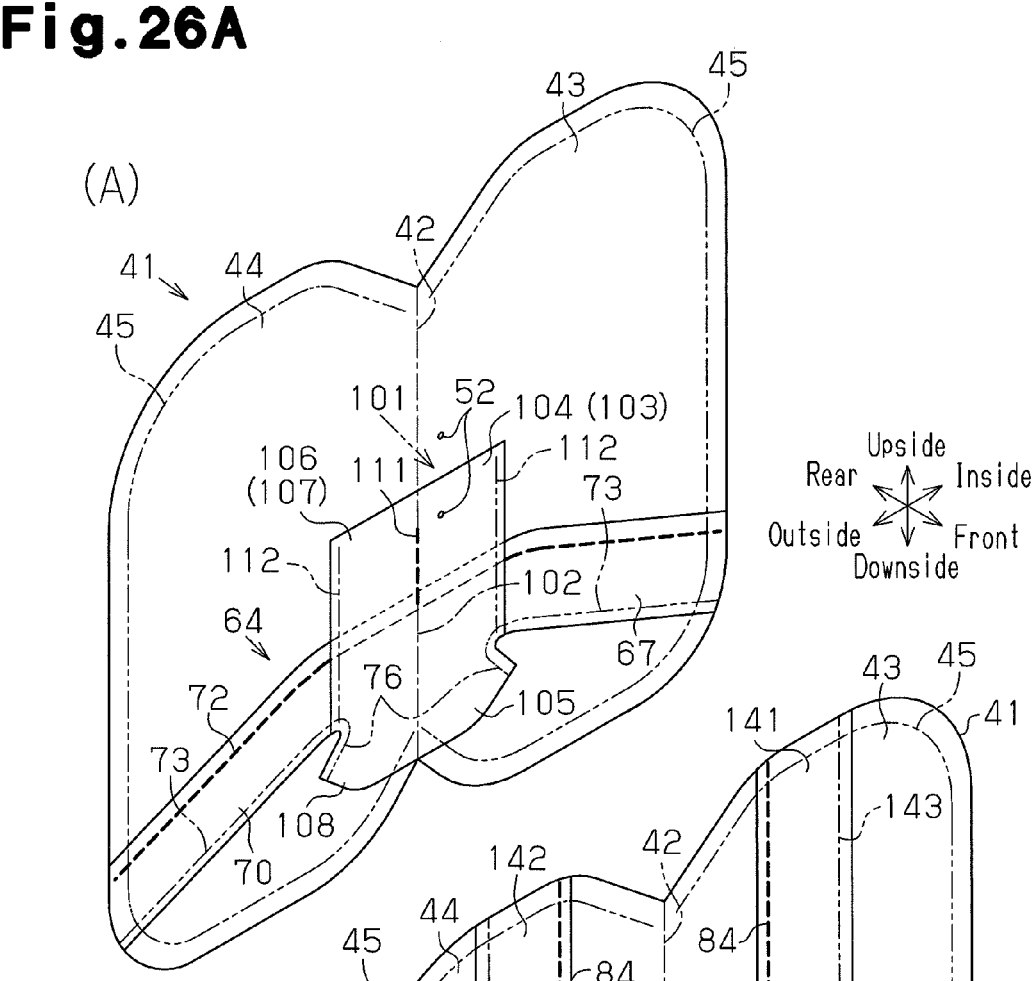
FIG. 26A is an explanatory perspective view showing a state subsequent to FIG. 25, illustrating an intermediate joining step of the airbag.

In the intermediate joining process, the inner tube 101 in a spread state is sewn to the airbag main body 41 and the lateral partition 64, which are in a spread state, to form a center joint portion 111 as shown in FIGS. 25 and 26A. The center joint portion 111 attaches the inner tube 101 to the airbag main body 41 and the lateral partition 64.

Figure 26B:
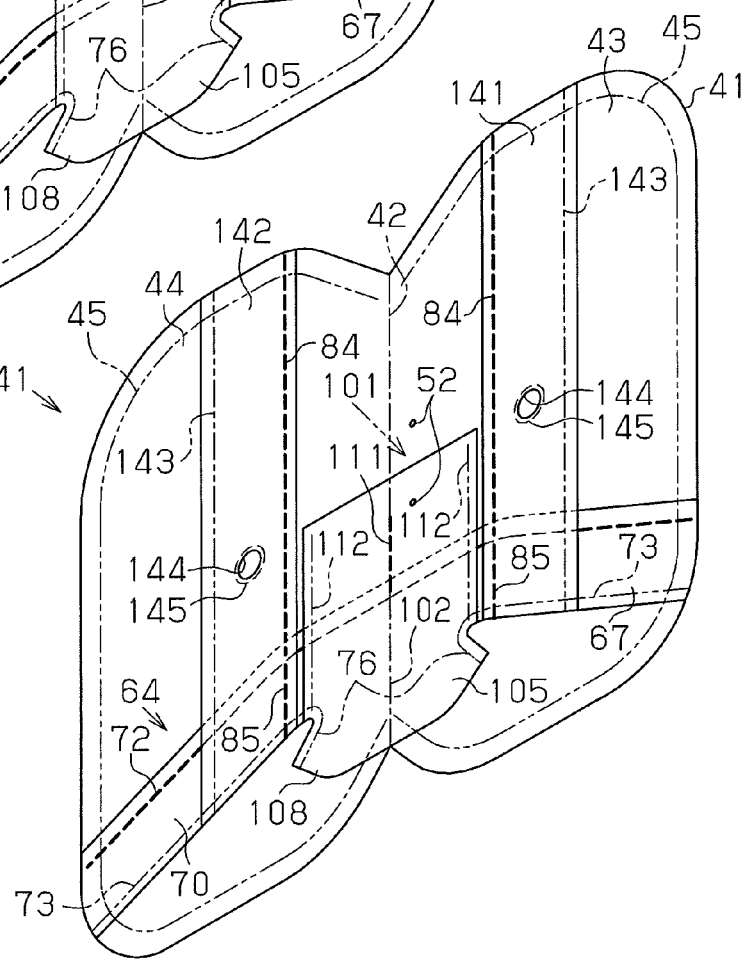
FIG. 26B is an explanatory perspective view showing a state subsequent to FIG. 25, illustrating the intermediate joining step of the airbag.
Figure 28:
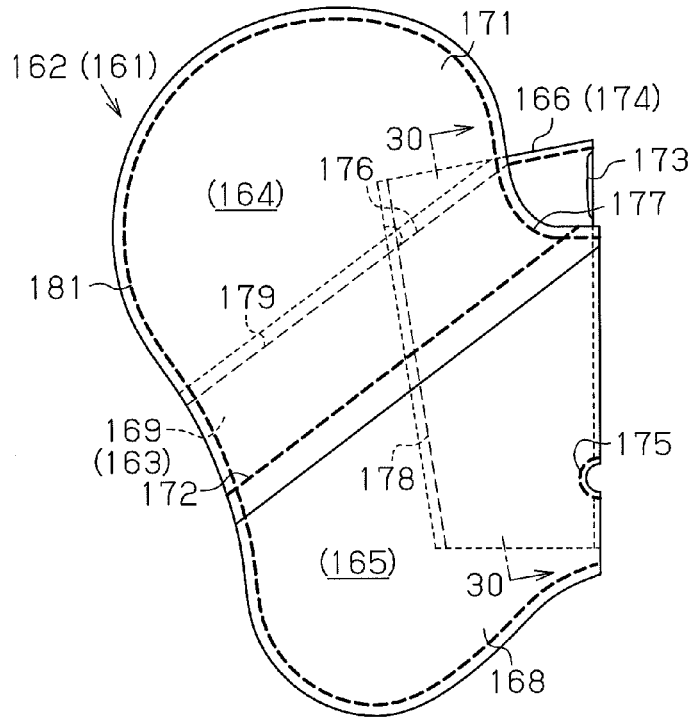
FIG. 28 is a side view showing an airbag of a conventional side airbag apparatus.
Figure 29:
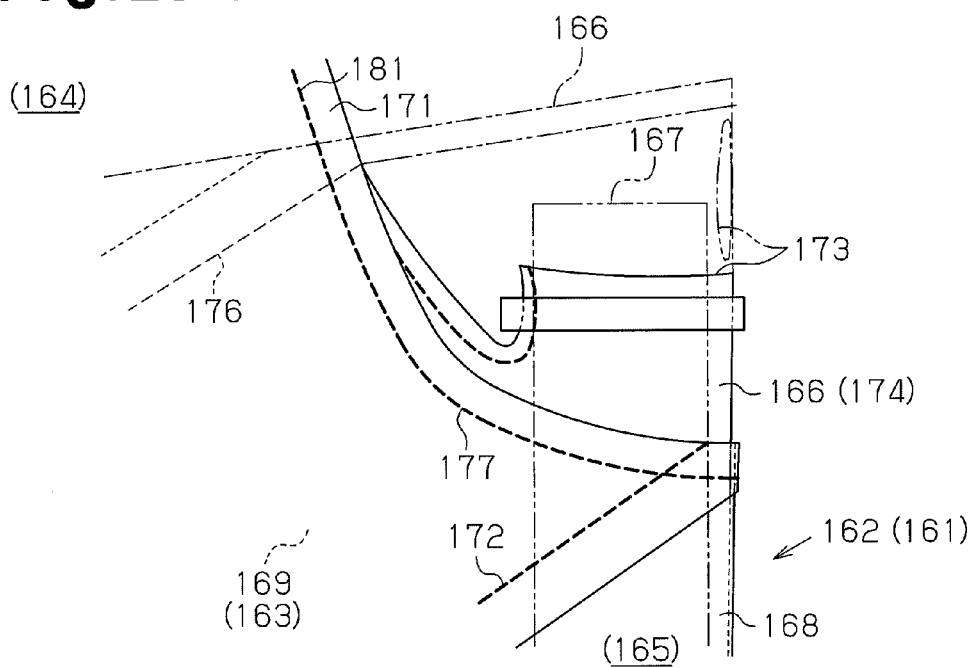
FIG. 29 is a partial side view showing a state in which an inflator is installed in the airbag shown in FIG. 28.

Next, as shown in FIG. 26B, a pair of the fabric pieces 141, 142, which forms the vertical partition 81, is overlaid onto the airbag main body 41 and the lateral partition 64 in the spread state. The communication holes 144 and the reinforcement loop portions 145 are formed in the fabric pieces 141, 142.

The rear peripheral portions of the parts of the fabric pieces 141, 142 that do not overlap with the main body forming fabric portions 67, 70 are sewn to the main body fabric portions 43, 44, to form an outer joint portion 84 in each of the fabric pieces 141, 142. The rear peripheral portions of the parts of the fabric pieces 141, 142 that overlap with the main body forming fabric portions 67, 70 are sewn only to the main body forming fabric portions 67, 70, to form an outer joint portion 85 in each of the fabric pieces 141, 142.

When sewing the fabric pieces 141, 142, the outer joint portions 84 may be formed either before or after the outer joint portions 85 are formed.

Subsequently, as shown in FIG. 27A, the inner tube 101 is folded in half along the folding line 102 (refer to FIG. 26B), and the structural fabric portion 103 and the structural fabric portion 106 are overlaid onto each other. The main body forming fabric portions 104, 107 are sewn to each other along the front peripheral portions, so that the peripheral joint portion 112 is formed. The peripheral joint portion 112 joins the main body forming fabric portion 104, 107 to each other, so that the inner tube 101 has a tubular shape.

Further, as shown in FIG. 27B, the fabric pieces 141, 142 are brought close to each other and overlaid onto each other with the inner tube 101 is encompassed by the fabric pieces 141, 142. The fabric pieces 141, 142 are sewn to each other along the front peripheral portions, so that the peripheral joint portion 143 is formed. The fabric pieces 141, 142 are coupled to each other by the peripheral joint portion 143, so that the vertical partition 81, which has the communication holes 144, is formed to extend between the main body fabric portions 43, 44.

After the intermediate joining process is executed, the fourth and fifth joining steps are executed. Since the contents of the fourth and fifth joining steps are the same as those described in the first embodiment, the descriptions are omitted.

In this manner, the airbag 40 is formed, which includes the lateral partition 64 and the vertical partition 81, which extend between the main body fabric portions 43, 44, and the inner tube 101, which intersects with the lateral partition 64.

Operation of the side airbag apparatus according to the second embodiment, which is manufactured in the processes described above, will now be described. The difference of the operation from that of the first embodiment is that inflation gas flows via the communication holes 144 instead of the opening 94 and the pressure regulator valve 97.

When an impact has been applied to the body side portion 11 due to a side collision or the like while the vehicle 10 is running, the inflator 31 shown in FIG. 21 discharges inflation gas, some of which is first supplied to the first inflation chamber 61. When the first inflation chamber 61 starts being inflated by the inflation gas, the internal pressure of the first inflation chamber 61 starts increasing. This causes the first inflation chamber 61 to be unfolded (deployed) in the reverse order of that in which it was folded.

Also, a greater amount of inflation gas than that is discharged by the inflator 31 and delivered to the first inflation chamber 61 is caused to flow into the third inflation chamber 63 via the check valve 75. When the third inflation chamber 63 starts being inflated by the inflation gas, the internal pressure of the third inflation chamber 63 is increased. This causes the third inflation chamber 63 to be unfolded (deployed) in the reverse order of that in which it was folded.

From the middle of the deployment and inflation of the first inflation chamber 61, some of the inflation gas in the first inflation chamber starts flowing to the second inflation chamber 62 via the communication holes 144. When the second inflation chamber 62 starts being inflated by the inflation gas, the internal pressure of the second inflation chamber 62 starts increasing. This causes the second inflation chamber 62 to be unfolded (deployed) in the reverse order of that in which it was folded.

The airbag 40, in which the first inflation chamber 61, the second inflation chamber 62, and the third inflation chamber 63 are each deployed and inflated as described above, is located between the upper body of the occupant P and the inwardly bulging body side portion 11. The airbag 40 pushes the upper body of the occupant P inward of the vehicle and restrains the upper body. The side impact transmitted to the upper body of the occupant P through the body side portion 11 is reduced by the first to third inflation chambers 61 to 63 and the upper body of the occupant P is protected.

Thus, the second embodiment has the following advantage in addition to the above described advantages (1) to (3).

(5) In the first embodiment, as shown in FIG. 24A, the vertical partition 81 is folded in half such that the area 81A, which is located between the outer joint portions 84, 85 in an uninflated and deployed state of the airbag main body 41, is located rearward of the outer joint portions 84, 85. According to the structure of the first embodiment, the area 81A is located close to the inner tube 101 and the inflator assembly 30.

If such a structure is employed in a side airbag apparatus in which the vertical partition 81 is located at a further rearward position, the area 81A of the vertical partition 81 is likely to interfere with the inner tube 101 and the inflator assembly 30. If such interference occurs, it is difficult to perform the joining steps for manufacturing the airbag 40.

In this regard, as shown in FIG. 24B, the vertical partition 81 is folded in half such that the area 81A, which is located between the outer joint portions 84, 85, is located forward of the outer joint portions 84, 85. In this structure, the area 81A of the vertical partition 81 is separated away from the inner tube 101 and the inflator assembly 30.

If such a structure is employed in a side airbag apparatus in which the vertical partition 81 is located at a further rearward position, the area 81A of the vertical partition 81 is unlikely to interfere with the inner tube 101 or the inflator assembly 30. This facilitates the joining steps for manufacturing the airbag 40. Also, the vertical partition 81 is allowed to be located at a further rearward position, which adds to the flexibility of design when determining the position of the vertical partition 81.

The above embodiments may be modified as follows.
<Regarding Inflator Assembly 30>
The retainer 32 may have a closed lower end and an open upper end, or may have open upper and lower ends.

The inflator 31 may be directly attached to the seat back 14 (the side frame portion 17) without using the retainer 32.

In the first embodiment, the inflator assembly 30 may be entirely located inside the inflation portion 46 (the first inflation chamber 61).
<Regarding Inflation Portion 46>
The substantially entire airbag 40 may be formed of the inflation portion 46 as in the first and second embodiments, but may also partially include a non-inflation portion, which neither supplied with inflation gas nor inflated.

The part of the side of the body of the occupant P to be restrained and protected by the first inflation chamber 61 and the second inflation chamber 62 may be different from that of the first and second embodiments.

For example, the first inflation chamber 61 may be deployed and inflated beside the front half of the thorax PT, and the second inflation chamber 62 may be deployed and inflated beside the space in front of the thorax PT. In this case, the second inflation chamber 62 may be configured to receive inflation gas that has flowed from the first inflation chamber 61, thereby adjusting the internal pressure of the first inflation chamber 61.

The vertical partition 81 in the inflation portion 46 may be omitted so that the inflation space above the lateral partition 64 only includes a single inflation chamber (an upper inflation chamber).
<Regarding Lateral Partition 64>
In place of the tether extending between the main body fabric portions 43 and 44 of the airbag main body 41, the lateral partition 64 may be formed by a seam that is generated by bringing the main body fabric portions 43, 44 in contact with each other and sewing (joining) these together.

The lateral partition 64 does not necessarily have the check valve 75.
<Regarding Vertical Partition 81>
In the first embodiment, at least one of the upper fabric piece 86 and the lower fabric piece 87 of the vertical partition 81 may be divided into two along the folding line 82.

The peripheral portions 83 of the vertical partition 81 may be joined to the main body fabric portions 43, 44 either inside the first inflation chamber 61 or inside the second inflation chamber 62.

Also, one of the peripheral portions 83 of the vertical partition 81 may be joined inside the first inflation chamber 61, and the other peripheral portion 83 may be joined inside the second inflation chamber 62.

In the first embodiment, the opening 94 does not necessarily need to extend in the direction perpendicular to the folding line 82 of the vertical partition 81, but may extend in a direction diagonal to the folding line 82 or in a direction along the folding line 82.

In the first embodiment, the vertical partition 81 may be formed by a single member (fabric piece).

In the first embodiment, parts of the overlapping portions 91 that correspond to the opening 94 (parts in the vicinity of the opening 94, or more accurately, parts between the opening 94 and the edges 88E, 89E) function as the valve bodies 95, 96. Therefore, as long as at least the distal ends 95T, 96T of the valve bodies 95, 96 are in contact with each other and are closed when the first inflation chamber 61 is deployed and inflated, parts of the overlapping portions 91 that do not correspond to the opening 94 (parts not in the vicinity) may be modified. For example, parts of the overlapping portions 91 that do not correspond to the opening 94 (parts not in the vicinity) may be joined partially or entirely. The joining means may be sewing or adhering. According to this modification, only parts of the overlapping portions 91 that correspond to the opening 94 operate as the valve bodies 95, 96, and parts of the overlapping portions 91 that do not correspond to the opening 94 are prevented from unnecessarily moving, for example, flapping.

Furthermore, a cutout may be formed at least at part of the portion of the overlapping portions 91 that does not correspond to the opening 94.

In the first embodiment, the vertical partition 81 may be formed by a member different from the members forming the valve bodies 95, 96.

In the first embodiment, the folding line 82 of the vertical partition 81 when folded in half may be slightly inclined with respect to the up-down direction of the airbag module AM.

In the first embodiment, the portion to be disjoined is canceled in the inner joint portion 93 does not necessarily have to be provided at a portion that extend across the folding line 82, but may be provided at a portion displaced away from the folding line 82 in the direction intersecting with the folding line 82.

In the first embodiment, the inner joint portions 93 may be disjoined at two or more positions.

In the first embodiment, the overlapping portions 91, which include the valve bodies 95, 96, may be provided in the second inflation chamber 62 instead of the first inflation chamber 61, prior to deployment and inflation of the inflation portion 46.

In the first embodiment, the vertical partition 81 is folded in half such that the area 81A, which is located between the outer joint portions 84, 85 in an uninflated and deployed state of the airbag main body 41, may be located forward of the outer joint portions 84, 85 as in the second embodiment. In this case, the overlapping portions 91, which have the valve bodies 95, 96, may be located in the second inflation chamber 62 before the inflation portion 46 is deployed and inflated.

In the first embodiment, the edges 88E, 89E of the ends 88, 89 of the fabric pieces 86, 87 of the vertical partition 81 may be overlaid onto each other to form a pair of overlapping portions 91.

The vertical partition 81 may have an outer shape different from those in the first and second embodiment. In this case, the outer shape of the vertical partition 81 is preferably changed in accordance with a part of the upper body of the occupant P to be restrained and protected by the first inflation chamber 61. Accordingly, the structure of the outer joint portion 84, which joins the vertical partition 81 to the main body fabric portions 43, 44, is different from that in the first and second embodiments. For example, when protecting the shoulder region PS of the occupant P in a wider area, the outer joint portion 84 may be provided forward of its position in the first and second embodiments. In this case, for example, a part of the outer joint portion 84 that joins the upper fabric piece 86 to the main body fabric portions 43, 44 may be inclined forward toward the upper end.

Only one of the fabric pieces 141, 142 may have a communication hole 144 in the second embodiment. Alternatively, at least one of the fabric pieces 141, 142 may have a plurality of communication holes 144.

If the communication holes 144 have a sufficiently high strength in the second embodiment, the reinforcement loop portions 145 may be omitted.

<Regarding Storage Portion 21 of Airbag Module AM>

Instead of the seat back 14 of the vehicle seat 12, a part that corresponds to the storage portion 21 may be located in the body side portion 11 to accommodate the airbag module AM.

<Regarding Check Valve 75>

The check valve 75 may be formed by a member separate from the lateral partition 64 and the inner tube 101.

<Regarding Inner Tube 101>

The shape of the inner tube 101 may be changed as long as the following conditions are satisfied.

Condition 1: The inner tube 101 encompasses at least the gas outlet 31A of the inflator 31.

Condition 2: The inner tube 101 extends substantially in the up-down direction while intersecting with the lateral partition 64 and extends over the first inflation chamber 61 (the upper inflation chamber) and the third inflation chamber 63 (the lower inflation chamber).

Condition 3: At least the lower end of the inner tube 101 intersects with the lateral partition 64.

Thus, the inner tube 101 may, for example, encompass the entire inflator 31.

The inner tube 101 may intersect with the lateral partition 64 only at the lower end of the inner tube 101.

The peripheral joint portion 112 in the first embodiment may be extended straightly without being bent or curved to bulge rearward without being bent.

<Other Modifications>

It is possible to employ, in a side airbag apparatus having no inner tube 101, the configuration of the second embodiment, in which the vertical partition 81 of the airbag main body 41 in an uninflated and deployed state has an area 81A that is located between the outer joint portions 84, 85, and the area 81A is located forward of the outer joint portions 84, 85. In this case, even if the vertical partition 81 is designed to be located at a further rearward position, the interference of the area 81A of the vertical partition 81 with the inflator assembly 30 is effectively suppressed.

In each of the illustrated embodiments, the outer joint portions 72, 84, 85, the inner joint portions 93, the joint portions 73, 76, 77, the center joint portion 111, and the peripheral joint portion 112 are formed by sewing with sewing threads, but may be formed by, for example, using an adhesive.

The part of the upper body of the occupant P to be protected by the side airbag apparatus may be different from that in the first and second illustrated embodiments.

The present invention may be applied to a side airbag apparatus of a vehicle in which a seat 12 that faces in a direction other than the forward direction, for example, sideways. In this case, when an impact is applied to a side of the vehicle seat 12 (in the front-rear direction of the vehicle), the side airbag apparatus protects an occupant P from the impact.

The term vehicle herein refers to not only passenger vehicles and various types of industrial vehicles, but also any type of passenger transport means. For examples, vehicles include aircrafts and ships.

Therefore, the present examples and embodiments are to be considered as illustrative and not restrictive and the invention is not to be limited to the details given herein, but may be modified within the scope and equivalence of the appended claims.

The invention claimed is:

1. A side airbag apparatus comprising a bag-shaped airbag main body having an inflation portion and an inflator having a gas outlet that discharges inflation gas for inflating the inflation portion of the airbag main body, wherein the airbag main body is formed by a pair of main body fabric portions, wherein the main body fabric portions are overlaid onto each other in a widthwise direction of a vehicle seat, peripheries of the main body fabric portions are joined to each other at a peripheral joint portion, the airbag main body is deployed forward on a side of an occupant seated in the vehicle seat as the inflation portion is inflated, the airbag main body includes a lateral partition extending between the main body fabric portions, wherein the lateral partition divides at least a part of the inflation portion into an upper inflation chamber above the lateral partition and a lower inflation chamber below the lateral partition, and an inner tube, which encompasses at least the gas outlet of the inflator, wherein the inner tube extends in the inflation portion and over the upper inflation chamber and the lower inflation chamber, while intersecting with the lateral partition, the lateral partition is formed by a pair of structural fabric portions, each structural fabric portion has a first peripheral portion and a second peripheral portion, the first peripheral portions of the structural fabric portions are each joined to one of the main body fabric portions, the second peripheral portions of the structural fabric portions are joined to each other by a joint portion provided along the second peripheral portions, the inner tube intersects with the lateral partition at least at a lower end of the inner tube, a rear peripheral portion of a part of the inner tube that intersects with the lateral partition is joined to the main body fabric portions by a part of the peripheral joint portion, and a front peripheral portion of the part of the inner tube that intersects with the lateral partition is joined to the structural fabric portions by a part of the joint portion.

2. The side airbag apparatus according to claim 1, wherein a check valve is provided at the part of the lateral partition that intersects with the inner tube and at the part of the inner tube that intersects with the lateral partition, wherein the check valve restricts the inflation gas that has flowed into the lower inflation chamber via the inner tube from flowing out to the upper inflation chamber, a part of the joint portion forms a part of the check valve, and the front peripheral portion of the part of the inner tube that intersects with the lateral partition is joined to the structural fabric portions by the joint portion.

3. The side airbag apparatus according to claim 1, wherein the airbag main body further includes a vertical partition extending between the main body fabric portions, the vertical partition divides at least a part of the upper inflation chamber into a first inflation chamber located rearward of the vertical partition and a second inflation chamber located forward of the vertical partition, the inflation gas is supplied to the first inflation chamber via the inner tube, and the vertical partition has an opening that connects the first inflation chamber and the second inflation chamber to each other and a valve that selectively opens and closes the opening.

4. The side airbag apparatus according to claim 1, wherein the airbag main body further includes a vertical partition extending between the main body fabric portions, the vertical partition divides at least a part of the upper inflation chamber into a first inflation chamber located rearward of the vertical partition and a second inflation chamber located forward of the vertical partition, the inflation gas is supplied to the first inflation chamber via the inner tube, the vertical partition is joined to the main body fabric portions at a pair of peripheral portions, wherein the peripheral portions face each other in the widthwise direction of the vehicle seat, and a part of the vertical partition that is located between the peripheral portions when the airbag main body is arranged in an uninflated and deployed state is located forward of the peripheral portions.

\* \* \* \* \*